(12) United States Patent
Cazier

(10) Patent No.: US 7,190,806 B2
(45) Date of Patent: Mar. 13, 2007

(54) SYSTEM AND METHOD FOR DATA ENCRYPTION/DECRYPTION

(75) Inventor: Robert P. Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 874 days.

(21) Appl. No.: 10/233,836

(22) Filed: Aug. 30, 2002

(65) Prior Publication Data
US 2004/0044670 A1    Mar. 4, 2004

(51) Int. Cl.
*G06K 9/00*    (2006.01)
(52) U.S. Cl. ..................... 382/100; 713/176
(58) Field of Classification Search ............... 382/100; 713/176
See application file for complete search history.

(56) References Cited

U.S. PATENT DOCUMENTS

| 5,898,779 | A  | * | 4/1999  | Squilla et al. | .............. | 713/176  |
| 6,259,801 | B1 | * | 7/2001  | Wakasu         | ............... | 382/100  |
| 6,282,299 | B1 | * | 8/2001  | Tewfik et al.  | ............... | 382/100  |
| 6,373,974 | B2 | * | 4/2002  | Zeng           | ............... | 382/135  |
| 6,563,964 | B1 | * | 5/2003  | Hallberg       | ............... | 382/299  |
| 6,963,363 | B1 | * | 11/2005 | Ohmura         | ............... | 348/231.3 |

* cited by examiner

*Primary Examiner*—Jingge Wu
*Assistant Examiner*—Patrick L. Edwards

(57) ABSTRACT

System and method for data encryption/decryption are disclosed including method and apparatus that uniquely identifies captured images.

64 Claims, 9 Drawing Sheets

SYSTEM AND METHOD FOR DATA ENCRYPTION/DECRYPTION

CROSS-REFERENCE TO RELATED APPLICATIONS

This application is related to U.S. patent application Ser. No. to be assigned, filed on the same date as the present application, and entitled "REFERENCING INFORMATION IN AN IMAGE", docket 100202877-1, which is entirely incorporated herein by reference.

BACKGROUND

In digitally based image capturing devices an image or "photograph" of an object is stored in a digital data format in the memory within, or coupled to, the image capturing device. A nonlimiting example of a digital image capturing device is the digital camera that captures still images and/or video images. Captured images are stored in a memory that resides within or is coupled to the digital camera.

Watermarking and other tampering detection techniques are known in the art for protecting the integrity of individual digital images. Tamper detection techniques allow confirmation that the digital image has not been altered or otherwise tampered with.

However, digital images can be altered or otherwise tampered with when the encryption schemes are known by or are broken by unauthorized individuals skilled in the art of encryption technologies.

Many image encryption and decryption technologies are complex. Once implemented, some encryption techniques require a substantial amount of computational capacity and time from the processing device that encrypts and/or decrypts the protected image. Furthermore, when a public/private key system is employed, separate data files must be separately managed in a secure manner to prevent an unauthorized individual from having access to the keys. Other encryption systems may also employ separate files that must be securely communicated to the intended recipient of the decrypted image.

Encryption techniques, such as watermarking, alter information in selected pixels such that the altered pixels contain encryption information. The encryption information is detected electronically during decryption and used for verifying that the image has not been tampered with, forged or otherwise altered. However, the amount of information that can be stored by altering a pixel is limited. If the pixel data is altered too greatly, the altered pixel may be detectable by a person viewing the image. Altering pixel data to a point that is discernable to a person viewing the image is particularly undesirable when important portions of the image are encrypted to provide security. Thus, the degree of allowable pixel alteration is limited to being below the visibility threshold of the person viewing the image if the image is to remain visually pleasing to the viewer after encryption.

Furthermore, once a pixel is altered, such as when a watermark is added, that pixel is communicated to the intended recipient in its altered form. Accordingly, if the intended recipient desires to further process the image, such as by magnification, the watermark may become visible or otherwise hinder further processing of the image. In some encryption systems, restoring the altered pixel to its original, unaltered state is impossible or very difficult to accomplish.

SUMMARY

A system and method for protecting the integrity of a digital image is disclosed. Briefly described, in architecture, one embodiment is a method for uniquely identifying captured images with an image capture device. One method comprises the steps of receiving information corresponding to a captured image from a photosensor; generating a first image from the received information, the first image comprised of at least a plurality of first pixels corresponding to the captured image; generating a second image from the received information, the second image having a different resolution than the first image and comprised of at least a plurality of second pixels corresponding to the captured image; generating a header, the header comprised of information corresponding to the received information, selecting a plurality of encryption pixels from the plurality of first pixels, such that each one of the plurality of selected encryption pixels corresponds uniquely to one of the plurality of second pixels of the second image; and altering data of each one of the selected plurality of encryption pixels such that information uniquely identifying the captured image is encrypted into the selected plurality of encryption pixels, and such that corresponding ones of the plurality of second pixels remains unaltered so that the information is determinable by comparing the encrypted pixels with the unaltered second pixels.

Another embodiment is a method for uniquely identifying captured images with an image capture device, comprising the steps of receiving an image file, the received image file comprising at least a first image corresponding to a captured image comprised of at least a plurality of encryption pixels, a second image corresponding to the captured image comprised of at least a plurality of second pixels, the second image having a different resolution than the first image, and each one of the plurality of second pixels uniquely corresponding to one of the plurality of encryption pixels, and a header comprised of information corresponding to the received image file; retrieving the plurality of encryption pixels; retrieving the plurality of corresponding second pixels; determining a difference between each one of the retrieved encryption pixels and the corresponding second pixel; determining information corresponding to the determined difference; and comparing the determined information with predefined information such that when the determined information corresponds to the predefined information the captured image is known to be unaltered, and such that when the determined information is different from the predefined information the captured image is known to be altered.

BRIEF DESCRIPTION OF THE DRAWINGS

The components in the drawings are not necessarily to scale relative to each other. Like reference numerals designate corresponding parts throughout the several views.

DETAILED DESCRIPTION

A system and method for protecting the integrity of a digital image with a thumbnail image and a key is described in detail below. For convenience, a "digital image" is defined herein to include any of the various forms of digital information corresponding to an image that is captured by an image capture device.

Figure 1:
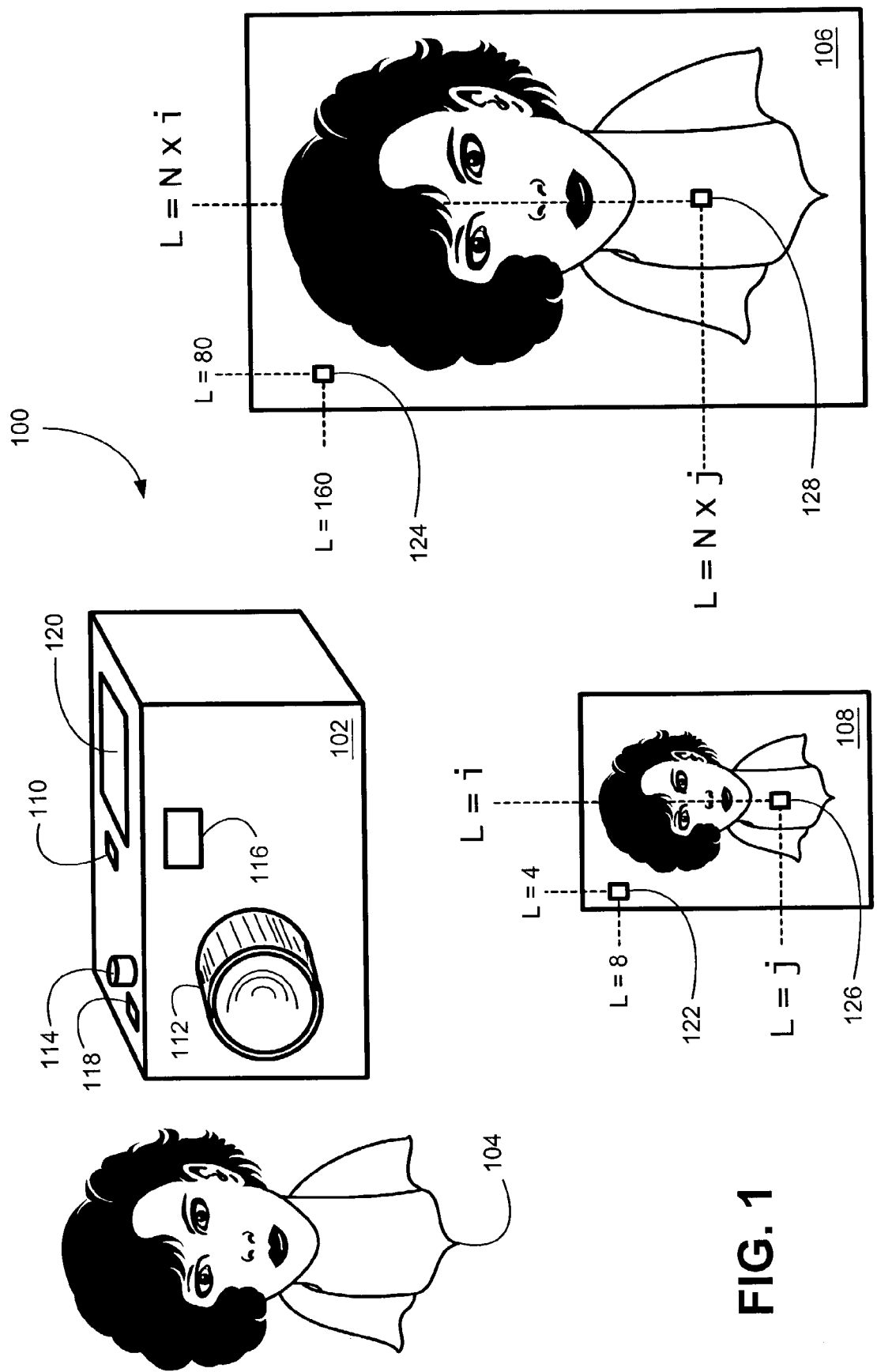
FIG. 1 is a block diagram illustrating one embodiment of a thumbnail encryption system implemented in a digital image capture device.

FIG. 1 is a block diagram illustrating one embodiment of a thumbnail encryption system 100 implemented in a digital image capture device. For convenience, one embodiment of the encryption system is implemented in a digital camera 102. Other embodiments of the thumbnail encryption system 100 can be implemented in any suitable image capture device, such as, but not limited to, a digital camera, a video camera, a facsimile (FAX) machine, a document scanner, a copy machine or the like.

Here, an image of a lady 104 is illustrated as being captured by digital camera 102. As described in greater detail below, when light is detected by a plurality of photosensor pixel elements, light information is generated. The light information is received and processed to generate at least two captured images of the lady 104. One image is a high resolution image 106. Another image is a lower resolution image, referred to herein for convenience as a thumbnail image 108. Thumbnail image 108 may be any suitable image having a relatively lower resolution than high resolution image 106. Preferably, the generated high resolution image 106 and the generated thumbnail image 108, along with other information such as a file name and header information, are combined into a single file, referred to herein as an image file.

Digital camera 102 may include at least a control button 110, a lens unit 112, an image capture actuation button 114, a viewing lens 116, a power switch 118 and display 120. Display 120 is used for previewing images prior to capturing or for viewing one or more thumbnail images 108 after image capture. For convenience of illustration, display 120 is illustrated on the top of digital camera 102.

High resolution image 106 is comprised of data from very many pixels. For example, one embodiment of digital camera 102 includes a photosensor 304 (FIG. 3A) having approximately three million pixel elements (not shown). Accordingly, the digital data in high resolution image 106 may have information corresponding to three million pixel elements. However, an image file having a high resolution image 106 with data corresponding to three million pixel elements is generally too large to be conveniently stored and/or communicated to other devices. Accordingly, the light information from the pixel elements is processed into data that corresponds to a relatively small, predefined area of the photosensor (or a predefined grouping of the pixel elements), hereinafter referred to for convenience as a pixel. For example, light information from three pixel elements (one sensitive to red light, an adjacent pixel element sensitive to green light and an adjacent pixel element sensitive to blue light) is processed into a single pixel having red, green and blue light information. Furthermore, the pixel includes location information that defines the location of that pixel on the image.

In some embodiments of digital camera 102, greater numbers of pixel elements may be specified to define a pixel. For example, rather than the three pixel elements described above (one red, one green and one blue pixel elements), nine pixel elements may be specified to form a pixel (three red, three green and three blue pixel elements). Accordingly, required memory capacity for storing the high resolution image 106 when nine pixel elements are employed is reduced by approximately a third. Pixel elements can be grouped in any suitable manner, so long as the final pixel is sufficiently small to provide acceptable image resolution when the data is processed to display the captured image. One embodiment includes a feature that enables a user of the image capture device to define, by proxy, the number of pixel elements combined to form a single pixel. Here, the user specifies the desired memory size of the image file (which includes at least header information, high resolution image 106 and thumbnail image 108).

When light information received from the pixel elements is processed into pixels for high resolution image 106, selected pixels are used to generate thumbnail image 108. Thumbnail image 108, accordingly, has a relatively small number of pixels (compared to high resolution image 106). When thumbnail image 108 is displayed on display 120, the relative size of display 120 is such that thumbnail image 108 is viewed with sufficient resolution so that thumbnail image 108 is visually pleasing to the viewer. Furthermore, because the size of the data file thumbnail image 108 is relatively small, the data for thumbnail image 108 can be quickly retrieved, processed and displayed on display 120.

If the high resolution image 106 is displayed on display 120, an undesirable time delay would be required to process and to display high resolution image 106. Furthermore, a significant amount of processing capacity would be required to generate an image suitable for display on display 120. Also, in portable embodiments of image capture devices, a corresponding amount of limited power supply (such as a battery) would be required to generate a suitable image from the data of high resolution image 106. Thus, when a captured image is displayed on display 120, thumbnail image 108 is retrieved from memory 302 (FIG. 3A) to save time and/or to conserve limited power resources.

In one embodiment, thumbnail image 108 is generated from high resolution image 106 by selecting pixels from high resolution image 106. Accordingly, each pixel in thumbnail image 108 has a corresponding pixel in high resolution image 106. The data for the pixel in thumbnail image 108 is the same as the data for the corresponding pixel in high resolution image 106. Furthermore, the pixel in thumbnail image 108 is spatially related to the corresponding pixel in high resolution image 106, as described in greater detail below.

In another embodiment, pixels in thumbnail image 108 and the corresponding pixel in high resolution image 106 are generated concurrently. Accordingly, as photosensor 304 is read, light information from selected pixels are used to concurrently generate a thumbnail image 108 and a high resolution image 106. For example, one embodiment uses light information from every tenth pixel to generate thumbnail image 108. All pixels are used to generate high resolution image 106. In another embodiment, selected pixels are grouped and combined to generate super-pixels. Super-pixels are then used to generate a high resolution image 106 and a corresponding image 108 as described above.

As described above, after thumbnail image 108 is generated, the data of the individual pixels in thumbnail image 108 is the same as the data of the corresponding pixels in high resolution image 106. Furthermore, pixels in thumbnail image 108 are spatially related to their corresponding pixels in high resolution image 106, as described in greater detail below.

Each pixel in thumbnail image 108 is spatially related to a corresponding pixel in high resolution image 106. That is, light information from selected pixels used to generate a thumbnail image 108 has a corresponding pixel in the high resolution image 106 that comprises the same data. Thus, the relative position of a thumbnail pixel in thumbnail image 108 has the same relative position as its corresponding pixel has in high resolution image 106. For example, the location of thumbnail pixel 122 is illustrated as having a location of 4,8 (where 4 is the horizontal direction along the x-axis, 8 is the downward vertical direction on the y-axis, the x-axis and y-axis origin at the upper left-hand corner of the image), and is denoted as "L=4" and "L=8" in FIG. 1.

Pixel 122 spatially corresponds to pixel 124 of the high resolution image 106. That is, pixels 122 and 124 have the same relative position in their respective image. For example, but not limited to, thumbnail image 108 is arbitrarily illustrated as being twenty (20) times smaller, in length and width, than high resolution image 106 in the simplified illustrative example of FIG. 1. Thus, the difference in the locations of pixels 122 and 124 differ by a factor of 20. Accordingly, the location of pixel 122, defined as 4,8 on thumbnail image 108, corresponds to pixel 124 having a location defined as 80,160 (where 80 is the horizontal direction along the x-axis, 160 is the downward vertical direction on the y-axis, the x-axis and y-axis origin at the upper left-hand corner of the image) on high resolution image 106. That is, the location of pixel 122 is known relative to the location of pixel 124. The corresponding low resolution and high resolution pixels 122 and 124 are hereinafter defined as a "pixel pair" for convenience.

Each of the pixels of thumbnail image 108 have a corresponding pixel in the high resolution image 106. That is, light information from selected pixels are used to generate a thumbnail image 108 and a high resolution image 106. Generally, any pixel 126, defined by location i, j on thumbnail image 108, has a corresponding pixel 128 defined by a location (N×i) and (N×j) on high resolution image 106. The term "N" above corresponds to the relative displacements between a pixel on thumbnail image 108 and high resolution image 106. In the simplified illustrative example described above, the value of N 20 because the x-axis value of pixel 122 is 4 and the x-axis value of pixel 124 is 80 (4×20=80). Also, the y-axis value of pixel 122 is 8 and the y-axis value of pixel 124 is 160 (8×20=160). Accordingly, pixels of thumbnail image 108 have a corresponding pixel in high resolution image 106. That is, for each of the pixels comprising thumbnail image 108, a pixel pair is defined using the corresponding pixel in high resolution image 106.

The location system described above is a very simplistic illustrative Cartesian coordinate system. The location of pixels in thumbnail image 108, and its corresponding pixel location on high resolution image 106, can be defined using any suitable coordinate system or location system. Cartesian coordinates or polar coordinates are non-limiting examples of coordinate systems that are used by embodiments of digital camera 102 (and personal computer 202, described below in FIG. 2). Also, the relative displacement N described above was an arbitrary value selected to demonstrate the spatial relationship between a pixel in thumbnail image 108 and its corresponding pixel in high resolution image 106. Any suitable relative displacement factor can be employed.

Furthermore, pixel 122 is illustrated as a relatively large square for convenience. A pixel is actually much smaller than the square used to illustrate pixel 122 (and other pixels described herein), and that the use of the square illustrating a single pixel is merely demonstrative.

One embodiment of the thumbnail encryption system 100 is predicated on pixel 122 having data that is the same as the data for pixel 124. Since pixel 122 and pixel 124 are comprised of the same data, and since high resolution image 106 and thumbnail image 108 are communicated together in a single image file 310 (FIG. 3A), one of the pixels of the pixel pair is selected to be the carrier of encryption information. For convenience, the pixel of a pixel pair selected to carry information is referred to herein as the encrypted pixel. Accordingly, when the image is encrypted, data for one of the pixels of a pixel pair is altered with information data referred to herein as encryption code data. The other pixel of the pixel pair is not altered, and is used as a reference pixel or an unaltered pixel. Thus, when the image is decrypted, the pixel data for the two pixels of a pixel pair are compared, and the difference in the pixel data corresponds to the encryption code data.

Returning to the simplified illustrative example of FIG. 1, pixel 124 is arbitrarily selected as the encrypted pixel. Thus, pixel data for pixel 124 is altered by adding encryption code data. Pixel 122 is the reference pixel or unaltered pixel. For example, if pixel 124 contained red, green, blue data of 1,3,1 (where the red=1, green=3 and blue=1), the green value could be encrypted to carry the encryption code data of 1 by altering the pixel data to 1,4,1. Thus, the green data is increased from a value of 3 to a value of 4 to carry the encryption code data of 1.

For convenience, the above-described simplified illustrative example presents the pixel data for pixel 124 as having three base-ten numbers, each number representing a blue value, a green value and a red value. In one embodiment, the pixel data is represented as three 8-bit words, where three bits would represent each color. Thus, the red value of 1, base ten, described above would be represented as 001 with an 8-bit word. Other embodiments employ other data formats. For example, but not limited to, the pixel data may be part of a black-and-white image, where the pixel data represents grayscale data having a predefined number of bits (for example, but not limited to, two to eight bits), depending upon the embodiment. As another non-limiting example, another embodiment employs pixel data having twenty-four bits of information. Other embodiments are equally applicable to any data format used to represent pixels, so long as there are two images available, a lower resolution image and a higher resolution image, such that encryption pixels from a plurality of pixel pairs are encrypted with encryption code data as described herein.

As described in greater detail below, a plurality of predefined pixels are selected in a predefined order for carrying encryption information. Thus, the predefined pixels can be encrypted to carry an encryption code. The manner in which pixels are selected for encryption, and the later decryption of the selected pixels, in accordance with various embodiments is described in greater detail below. For convenience, the term encryption used herein refers to the alteration of pixel data to represent at least a portion of the encryption code data. Similarly, the term decryption used herein refers to the inspection of the altered pixel data to determine the above-described portion of the encryption code data.

In the above-described, simplified illustrative example wherein data for pixel 124 was altered from 1,3,1 to 1,4,1, the small change in the data of the encrypted pixel is not likely to be visibly discernable to an individual viewing the image. Such encryption encrypts encryption code data in the selected encryption pixels of the pixel pairs having a value such that any distortion caused by an altered pixel is not visibly discernible to an individual viewing the image. Accordingly, the individual viewing an image having encryption data encrypted into encryption pixels, without electronic analysis of the image, would not be aware that the image has been encrypted.

Alternatively, the encryption data could have a value such that the altered pixel is visibly distorted. As another simplified illustrative example, data for pixel 124 could have been changed from 1,3,1 to 1,8,1 to encrypt an encryption code value of 5 into the green data. If many encrypted pixels were thus changed, the encrypted pixels could discernibly distort the encrypted image. However, since pixel 122 (residing in the thumbnail image 108) has not been altered, and since the value of pixel 122 is 1,3, 1 (equal to the original value of pixel 124), the encrypted pixel 124 can be easily restored and/or reconstructed. That is, encrypted pixel 124 can be easily restored and/or reconstructed to a pre-encryption value of 1,3,1 since the reference pixel 122 (or unaltered pixel 122) specifies the pre-encryption value of pixel 124.

In the simplified illustrative examples described above, the green data was arbitrarily selected for altering. Any part of, or all of, the pixel data could be selected for encryption. The manner of encrypting data into a selected pixel is limitless. More significantly, because one of the pixels of a pixel pair has not been altered, the type of encrypted code embedded in an encrypted pixel is not limiting because the encrypted pixel can be restored and/or reconstructed from the reference pixel.

When an encrypted image is visibly distorted by encrypted pixels, a person not possessing an embodiment of a decryption system will be limited to viewing visibly distorted images since a plurality of encrypted pixels carrying encryption code data cannot be restored and/or reconstructed. However, a person possessing a valid decryption system embodiment is able to view undistorted images since encrypted pixels may be restored and/or reconstructed prior to displaying the image.

In another embodiment, the images are configured to automatically reconstruct prior to display, such that a viewer does not have to view a distorted image having a plurality of encrypted pixels. In this embodiment, an uninformed individual viewing the image would not even be aware of the presence of encrypted code data residing in the encrypted pixel. Accordingly, an image file (having a thumbnail image 108 and a high resolution image 106) includes logic to decrypt the encryption code data and to reconstruct the encrypted pixels before the image is displayed. In one embodiment, the decryption code is included in the image file such that when the image file is opened, the encrypted pixels are automatically restored and/or reconstructed.

The above-described embodiment of a thumbnail encryption system 100 is described using pixel pairs. Each pixel pair is comprised of a pixel from a thumbnail image and a high resolution image. Each pixel in a pixel pair has the same data and is spatially related. In another embodiment, the thumbnail image pixel and the high resolution image pixel have different data values, but the relationship between the pixel data of each pixel pair is known. Accordingly, when the encrypted pixel having encryption code data is compared with the reference pixel, the data relationship is used to determine the data difference between the two pixels, and thereby allowing determination of the encryption information.

The above-described embodiment of a thumbnail encryption system 100 is described as having one of the pixels of a pixel pair selected to receive encryption code data. Data for the selected pixel is altered by embedding encryption code data. One embodiment alters pixel data from a thumbnail image. Another embodiment alters pixel data from a high resolution image. Yet another embodiment is configured to select the encryption pixel in a predetermined manner, or even a random manner, so that parts of the encryption code data is embedded in both the thumbnail image and the high resolution image.

Summarizing one embodiment, a pixel in thumbnail image 108 and a corresponding pixel in high resolution image 108, are pixel pairs. Initially, data for each pixel in a pixel pair is equal (or related by a known relationship). Furthermore, the pixels are spatially related to each other. One of the pixels of a pixel pair is selected for encryption (the encrypted pixel). Data for encrypted pixel is altered, as described herein, so that the encryption code data is embedded into the selected encrypted pixel. Data for the other pixel of the pixel pair (the reference pixel or the unaltered pixel) is not altered. By selecting a plurality of pixel pairs, any desired amount and type of encryption code data is embedded into an image by altering the selected encryption pixels. When the image is viewed, the embedded encryption data is determined by comparing the encryption pixel with the reference pixel of each pixel pair. In one embodiment, the encryption pixel is restored and/or reconstructed using the data of the reference pixel. The retrieved encryption code data is used to determine if the image has been tampered with.

Figure 2A:
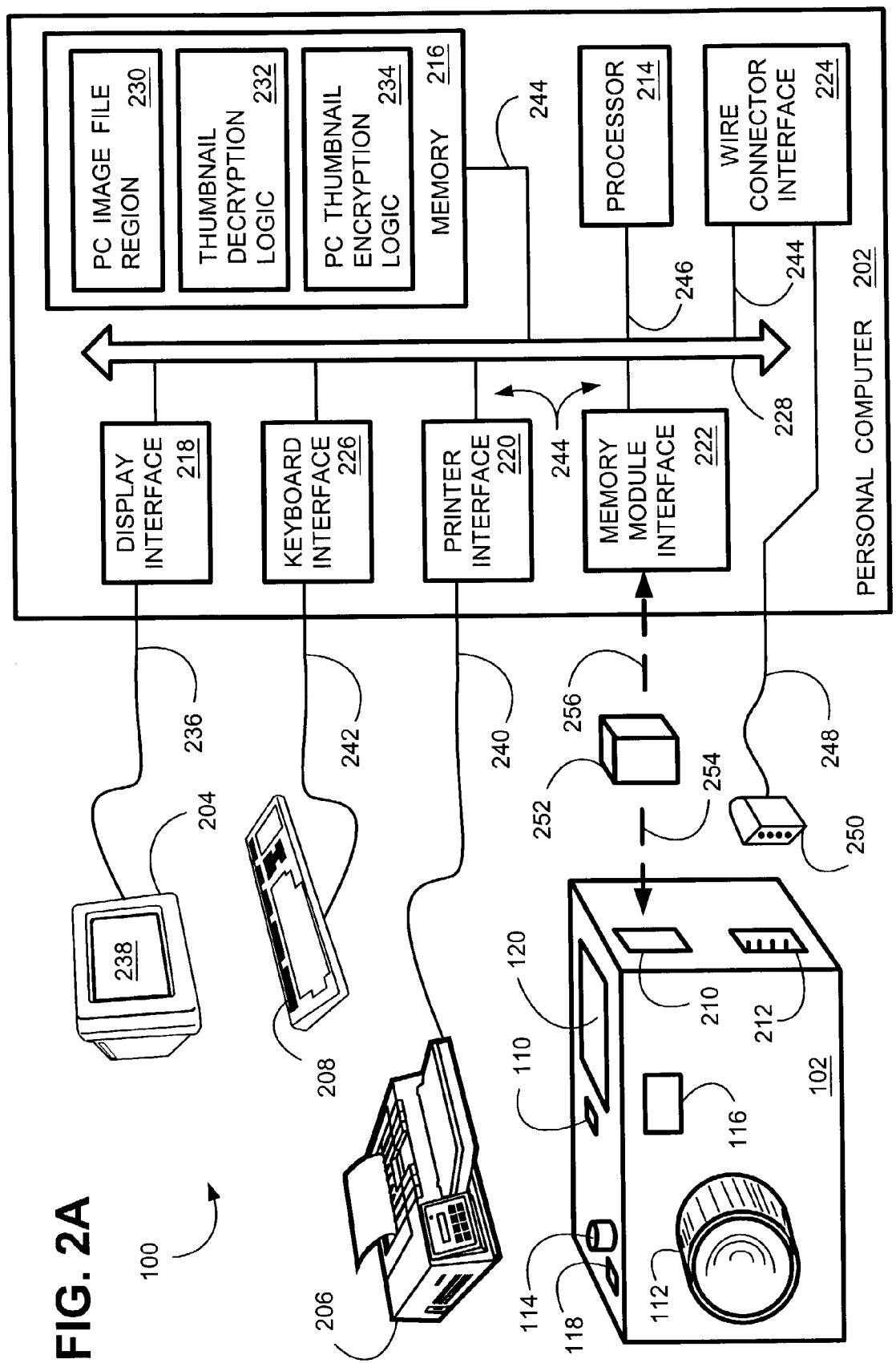
FIG. 2A is a block diagram illustrating an embodiment of a thumbnail encryption system implemented in a digital camera, and another embodiment of the thumbnail encryption system implemented in a personal computer.

FIG. 2A is a block diagram illustrating an embodiment of a thumbnail encryption system 100 implemented in digital camera 102. Another embodiment of the thumbnail encryption system 100 is implemented in personal computer 202. Personal computer 202 may further include, or be coupled to, a display 204, a printing device 206, a user interface device 208 (keyboard) and other peripherial devices (not shown). Digital camera 102 further includes at least a memory unit interface 210 and a plug-in interface 212.

Personal computer 202 is configured to communicate with digital camera 102 such that digital images captured by digital camera 102 may be retrieved, encrypted and/or decrypted. Personal computer 202 includes at least a processor 214 and a memory 216. Personal computer 202 may further include a display interface 218, a printer interface 220, a memory module interface 222, a wire connector interface 224, a keyboard interface 226 and a communication bus 228 (in addition to many other components not illustrated in FIG. 2 for convenience).

Memory 216 further includes a personal computer (PC) image file region 230 (where at least one image file having at least a high resolution image and a thumbnail image) and thumbnail decryption logic 232. PC image file region 230 and thumbnail decryption logic 232 are described in greater detail below. An alternative embodiment of personal computer includes PC thumbnail encryption logic 234. Memory 216 may also contain other data, logic and/or information used in the operation of personal computer 202. However, such data, logic and/or information are described herein only to the extent necessary to describe thumbnail encryption.

Personal computer 202 is illustrated as being coupled to display 204, via connection 236, so that captured images of a high resolution image and/or a thumbnail image can be viewed on display screen 238 residing in display 204. Personal computer 202 is further illustrated as being coupled to printer 206, via connection 240, so that a high resolution image and/or a thumbnail image is printed. Also, personal computer 202 is illustrated as being coupled to keyboard 208, via connection 242, so that an authorized individual can input relevant information regarding the encryption information and control execution of thumbnail decryption logic 232 and/or PC thumbnail encryption logic 234.

Memory 216, display interface 218, printer interface 220, memory module interface 222, wire connector interface 224 and keyboard interface 226 are coupled to communication bus 228 via connection 244. Communication bus 228 is coupled to processor 214 via connection 246, thereby providing connectivity to the above-described components. In alternative embodiments of personal computer 202, the above-described components are connectivley coupled to processor 214 in a different manner than illustrated in FIG. 2A. For example, one or more of the above-described components may be directly coupled to processor 214 or may be coupled to processor 214 via intermediary components (not shown).

For convenience, user interface device 208 is hereinafter referred to as keyboard 208. Other suitable user interfaces are employed in alternative embodiments such that an authorized individual can input relevant information regarding the encryption code data and control execution of thumbnail decryption logic 232 and/or PC thumbnail encryption logic 234.

In one embodiment of digital camera 102, digital camera 102 transfers captured image files to personal computer 202 via hard wire connection 248. Connection 248 is coupled to plug-in attachment 250. Plug-in attachment 250 is configured to connect to plug-in interface 212. The individual simply connects plug-in attachment 250 to plug-in interface 212 thereby establishing connectivity between digital camera 102 and personal computer 202. The authorized individual controlling execution of thumbnail decryption logic 232, PC thumbnail encryption logic 234, or other logic configured to communicate image files, then instructs personal computer 202 and/or digital camera 102 to transfer image files from digital camera 102 into the PC image file region 230. As described above, the transferred image files include at least a high resolution image 106 and a corresponding thumbnail image 108 (FIG. 1).

In another embodiment, image files are stored in memory module unit 252. When capturing images with digital camera 102, memory module unit 252 is coupled to digital camera 102 through memory unit interface 210, as illustrated by dashed line path 254. Image files are transferred to personal computer 202 by removing memory module unit 252 from digital camera 102 and coupling memory module unit 252 to memory module interface 222. Typically, a convenient coupling port or interface (not shown) is provided on the surface of personal computer 202 such that memory module unit 252 is directly coupled to personal computer 202, as illustrated by dashed line path 256. Once memory module unit 252 is coupled to memory module interface 222, image files are transferred into the PC image file region 230.

For convenience, personal computer 202 is illustrated as having only selected components of interest. However, personal computer 202 may include additional internal components that are not illustrated in FIG. 2A. These additional components are not shown and are not described in detail herein other than to the extent necessary.

Figure 3B:
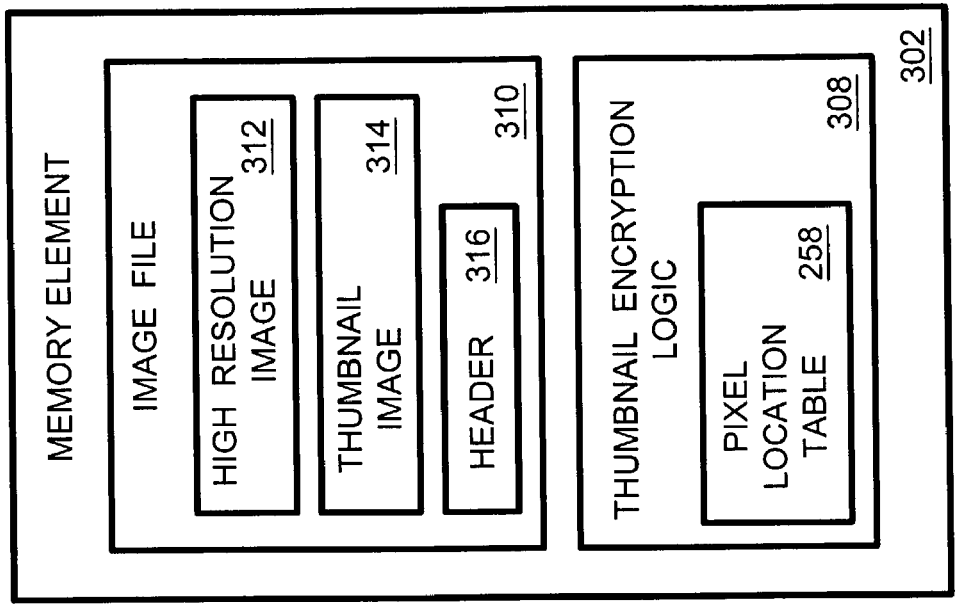
FIG. 3B is a block diagram illustrating a pixel location table residing in a memory element of a personal computer.
Figure 3A:
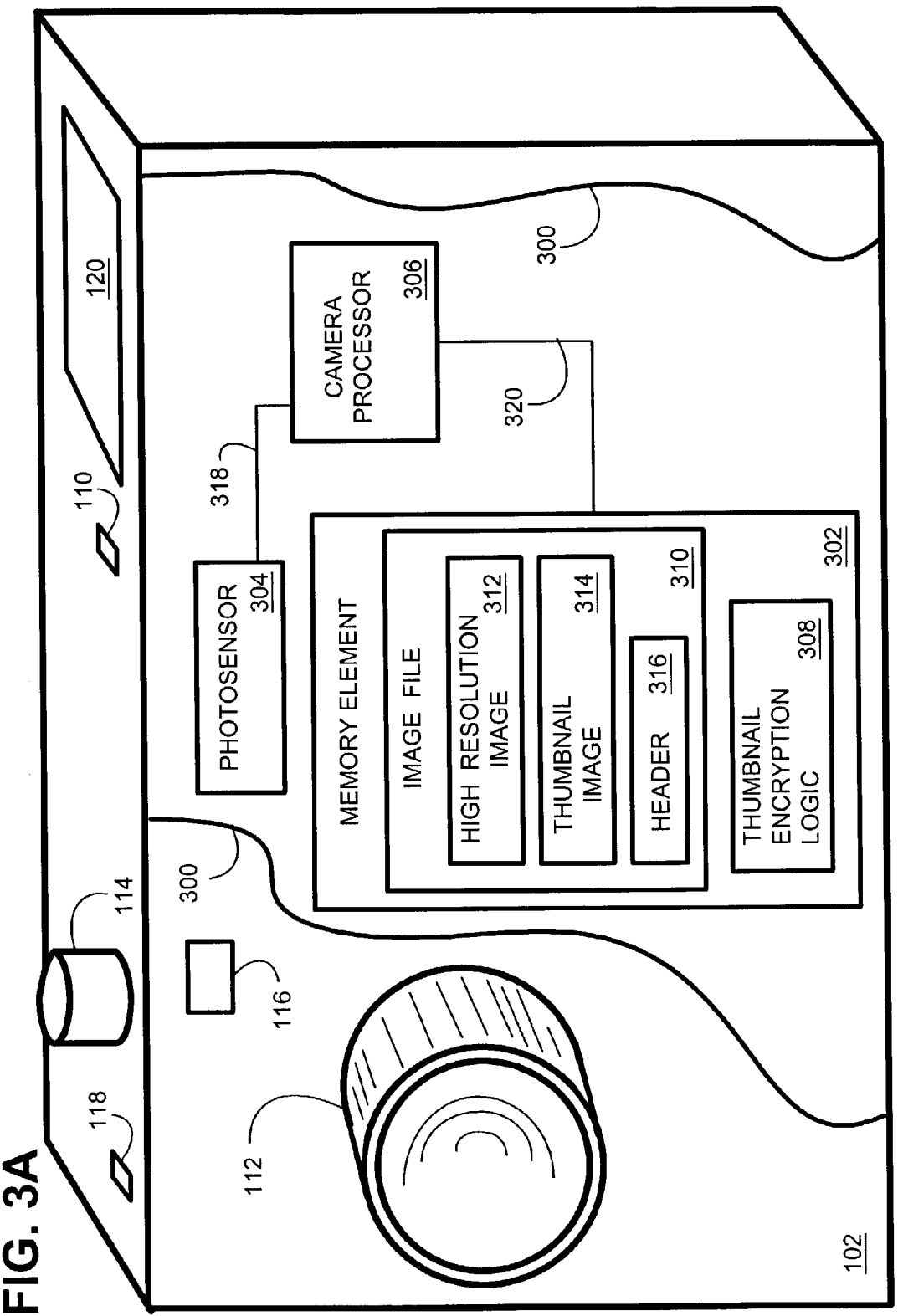
FIG. 3A is a block diagram of selected components of an embodiment of a digital camera.

FIG. 3A is a block diagram of selected components of an embodiment of digital camera 102. FIG. 3A includes selected external and internal components of the digital camera 102, demarked by cut-away lines 300. The internal components include at least memory 302, photosensor 304 and camera processor 306. In one embodiment, memory 302 further includes thumbnail encryption logic 308 and image file 310. Image file 310 is configured to store an image file having at least a high resolution image 312, a thumbnail image 314 and a header 316 that corresponds to a captured image.

Operation of the digital camera 102 is initiated by actuation of power switch 118 or an equivalent device having the same functionality. Display 120 may display a view of an image currently visible through lens unit 112 and detected by photosensor 304, referred to herein as a preview image. When digital camera 102 is displaying a preview image, digital camera 102 is referred to herein as operating in a preview mode.

Alternatively, an image of a previously captured image may be viewed on display 120. When digital camera 102 is displaying a previously captured image, digital camera 102 is referred to herein as operating in a review mode. In one embodiment, as described above, digital camera 102 displays a thumbnail image 108 (FIG. 1) on display 120. Furthermore, a menu screen may be displayed on display 120. In one embodiment, other buttons, switches or control interface devices (not shown) are additionally configured to operate display 120 such that menu items may be selected.

Prior to capturing an image of an object, wherein the image is encrypted, the operator of digital camera 102 may visually preview the image of the object on display 120. Or, the object may be viewed directly through viewing lens 116. Photosensor 304 is disposed in a suitable location behind lens unit 112 such that an image of the object is focused onto photosensor 304 for capturing. When the operator has focused the image of the object and is satisfied with the focused image, the operator actuates image capture actuation button 114 (also referred to as a shutter button or a shutter release button) to cause digital camera 102 to capture the image of the object, thus "photographing" the object. Photosensor 304 detects the image of the object through lens unit 112 and communicates digital image data corresponding to the detected image to camera processor 306, via connection 318.

In one embodiment, the digital image data corresponding to the captured image is processed by camera processor 306 to generate an image file having at least high resolution image 312, thumbnail image 314 and a header 316, as described herein. The digital image data is communicated to memory 302, via connection 320. Accordingly, the memory element 302 is configured to store many image files 310 having a header 316, a high resolution image 312 and a thumbnail image 314. Alternatively, corresponding thumbnail images and high resolution images may be saved separately into memory element 302.

In another embodiment, an image file is transferred to memory module unit 252 (FIG. 2A). When capturing images with digital camera 102, memory module unit 252 is coupled to digital camera 102 through the memory unit interface 210. As the user of digital camera 102 actuates image capture actuation button 114 to cause camera processor 306 to capture the current image detected by photosensor 304, camera processor 306 communicates the image file to memory module unit 252. Accordingly, memory module unit 252 is configured to store many image files having a header, a high resolution image and a thumbnail image.

For convenience, digital camera 102 is described above as employing both memory element 308 and memory module unit 252 to store image files. Preferably, digital camera 102 would, in practice, employ either memory element 308 or memory module unit 252 to store image files because employing two different and separate memory systems would be inefficient and costly. (However, it is possible some embodiments of a digital camera 102 could employ both memory element 308 and memory module unit 252.)

Figure 2B:
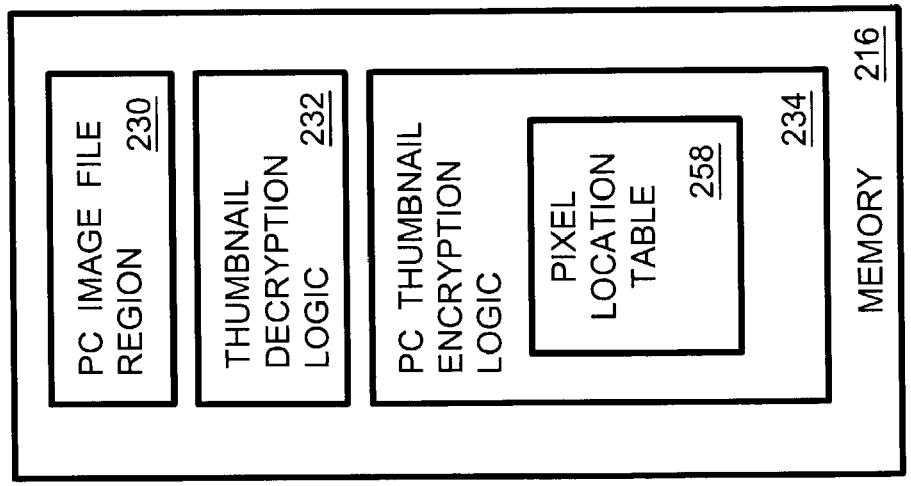
FIG. 2B is a block diagram illustrating a pixel location table residing in memory of a digital camera.

A first encryption system and method resides in an embodiment of the thumbnail encryption logic 308 (FIG. 3B) implemented in digital camera 102. For convenience, the first encryption system and method is described below as implemented in thumbnail encryption logic 308. The first encryption system and method is similarly implemented in an embodiment of PC thumbnail encryption logic 234 (FIG. 2B). Furthermore, as described herein, the encryption logic and/or the decryption logic may be implemented in other devices, such as, but not limited to, digital video cameras, FAX machines, copy machines or the like that are configured to generate image files having at least a header, a high resolution image and a thumbnail image as described herein. Accordingly, for convenience and brevity, such other variants of the first encryption system and method (or first decryption system and method) as implemented in other devices are not described herein in detail.

The first encryption system and method selects pixel pairs that are to be encrypted with encryption code data based upon selected portions of the image file header. For example, a portion of the header could include a file name. As a simplified illustrative example, a file name of "123.abc" is considered for the image file. As described below, the characters "123.abc" are interpreted to define the location of selected pixel pairs that will be encrypted.

One embodiment correlates the selected portion of the header with a predefined character code set. Such a predefined character code set may be based upon an industry standard, such as, but not limited to, the American standard code for information interchange (ASCII) character codes. Alternatively, the predefined character set could be specially designed and incorporated as part of the code of the thumbnail encryption logic 308.

For convenience, the first encryption system and method is described as using the simplified exemplary file name "123.abcz" and ASCII character symbols are used to specify the pixel pairs that are to be encrypted. When the file name "123.abcz" is converted into ASCII character codes, the following number string is generated: 49, 50, 51, 46, 97, 98, 99 and 122. For example, the character "1" has the ASCII character code of 49, the character "." has the ASCII character code of 46, and the character "a" has the ASCII character code of 97.

The character code of 49 for the character "1" is discussed as a decimal number for convenience to facilitate the disclosure. The character codes in some embodiments are represented as binary numbers rather than decimal numbers. For example, the character ")" can be represented as the decimal number 41 using the ASCII character set, and further represented as the eight bit binary number 00101001. In one embodiment, eight pixels are selected to store the binary number 00101001. In another embodiment, the red, green and blue color bits may be used to store information. For example, but not limited to, if a pixel employs eight bits, the decimal number 41 can be stored into one encryption pixel. If encryption pixels employ more bits (or less bits), then multiple numbers, and/or parts thereof, may be encrypted into the encryption pixels. The manners in which bits of an encryption pixel are encrypted with information is nearly limitless because the information is always determinable when an encryption pixel is compared with a reference pixel.

The exemplary generated ASCII character code string 49, 50, 51, 46, 97, 98, 99 and 122 is used to identify the pixel pairs. There are many schemes that may be selected that use the generated ASCII character code string to identify pixel pairs. One simplified exemplary scheme uses each successive pair of ASCII character codes to identify a location of a pixel in the thumbnail image 108. For each pair of ASCII character codes, the first code number of the ASCII character code pair identifies the x-axis location and the second code number specifies the y-axis location. Thus, in the simplified illustrative example above, and as related to the coordinate system illustrated in FIG. 1, the first two ASCII character codes 49 and 50 specify the 49,50 pixel in the thumbnail image 108.

Similarly, the next pair of ASCII character codes (the third and fourth ASCII character codes) of 51 and 46 specify the 51,46 pixel in the thumbnail image 108. Likewise, the fifth and sixth ASCII character codes 97 and 98 specify the 97,98 pixel in the thumbnail image 108. The seventh and eighth ASCII character codes of 99 and 122 specify the 99,122 pixel in the thumbnail image 108. Thus, eight ASCII character code numbers have defined the location of four pixels in thumbnail image 108 (the 49, 50 pixel, the 51,46 pixel, the 97,98 pixel and the 99,122 pixel).

Furthermore, once the four pixels of the thumbnail image 108 have been specified in the simplified exemplary example above, the corresponding pixels in the full resolution image 106 are known. In the simplified illustrative example of FIG. 1 wherein the relative displacement factor of N is equal to twenty (N=20), the displacement factor N defines the spatial relationship between a thumbnail pixel and a high resolution image pixel. Accordingly, the first defined thumbnail image pixel 49, 50 identifies the 980,1000 pixel in the high resolution image 106 (49×20=980 and 50×20=1000). Thus, the first two characters of the file name ("12") have specified the pixel pair 49,50 in the thumbnail image 108 and the pixel pair 980,1000 in the high resolution image 106.

Similarly, the second two characters of the simplified exemplary file name ("3.") have specified the second pixel pair 51,46 in the thumbnail image 108 and the pixel pair 1020,920 in the high resolution image 106. Likewise, the next two characters of the exemplary file name ("ab") have specified the pixel pair 97,89 and the corresponding pixel pair 1940,1960 as the third selected pixel pair. And, the last two characters of the exemplary file name ("cz") have specified the pixel pair 99,122 and the corresponding pixel pair 1980,2440 as the fourth selected pixel pair.

Once the pixel pairs are specified by the selected portion of the header, an encryption code can be embedded into the pixel data in any of the numerous manners described above.

Since the portion of the header that is selected to specify pixel pairs is coded directly into the thumbnail encryption logic 308, in one embodiment, the selected pixel pairs are secret. Furthermore, since portions of a header are likely to change with each image file, the portion of the header that is used can be selected such that the encryption code data uniquely identifies an image file because the selected portion of the header is unique to each image file.

Continuing with the simplified encryption example where the file name "123.abcz" identifies pixel pairs 49,50 and 980,1000; 51,46 and 1020,920; 97,89 and 1940,1960; and 99,122 and 1980,2440, an encryption code having four elements can be easily embedded into the selected encryption pixels (which may be either the thumbnail image pixel or the high resolution image pixel). To demonstrate, let a simplified exemplary encryption code be defined as 1234. The encryption code is known to both the thumbnail encryption logic 308 in digital camera 102 and to the thumbnail decryption logic 232 residing in personal computer 202. Furthermore, let the selected encryption pixels be from the high resolution image (HRIP) pixels and have the values as shown in Table 1 below. Also, assume the green pixel value is altered when the encryption code data is embedded into the encryption pixel. Thus, the thumbnail image pixel (TIP) values are not altered.

TABLE 1

Simplified Encryption Scheme

| Location | | Before Encryption | | After Encryption | | Difference |
|---|---|---|---|---|---|---|
| TIP | HRIP | TIP Value | HRIP Value | TIP Value | HRIP Value | in Value |
| 49, 50 | 980, 1000 | 100 | 100 | 100 | 110 | 1 |
| 51, 46 | 1020, 920 | 102 | 102 | 102 | 122 | 2 |
| 97, 98 | 1940, 1960 | 140 | 140 | 140 | 170 | 3 |
| 99, 122 | 1980, 2440 | 821 | 821 | 821 | 861 | 4 |

Table 1 illustrates that in the simplified example, the encryption code 1234 is encrypted into the green value (of the red, green, blue pixel values) of the encryption pixel, where the encryption pixel was selected from the high resolution image 106.

Headers include a variety of information. The simplistic example above demonstrates one embodiment wherein a portion of the header defines the location of pixel pairs. Any portion of the header may be selected to define as many pixel pairs as desired. Accordingly, very complex encryption codes can be embedded into selected encryption pixels. In one embodiment, the selected portion of the header is predefined and known by the thumbnail encryption logic 308. The selected portion of the header and the encryption code is not easily identified, or preferably not identifiable, by an individual or code breaking program. As will be discussed below, the selected portion of the header and the encryption code is also known to the thumbnail decryption logic 232.

In an alternative embodiment, the user of digital camera 102 specifies a portion of the header that will be used to specify pixel pairs and/or the user specifies an encryption code. Here, the user specified portion of the header and/or encryption code is communicated to the thumbnail decryption logic 232 so that the image can be decrypted.

The simplified example above defined pixel locations in the thumbnail image based upon successive pairs of ASCII character codes determined from a selected portion of the image file header. Alternative embodiments employ other schemes to identify pixel locations. One embodiment defines pixel locations in the high resolution image 106. Another embodiment uses each ASCII character code to define a location (the ASCII character code 49 defines the 4,9 pixel). Another embodiment uses the first code to define a y-axis location and the second code to define the x-axis. Another embodiment uses the ASCII character codes to define locations using a polar coordinate system.

Yet another embodiment uses ASCII character codes, or another suitable code system, in a binning manner. Returning to the above-described simplified exemplary example, the file name "123.abcz" specified the ASCII character code string 49, 50, 51, 46, 97, 98, 99 and 122. Using a binning process, pixel pairs could be defined by a sequence of ASCII character codes 49 and 50; 50 and 51; 51 and 46; 46 and 97; 97 and 98; 98 and 99; and 99 and 122.

The manner in which a portion of a header is selected and used to identify pixel locations is limitless, so long as the resulting process of identifying pixel locations results in locating at least one pixel in the pixel pairs.

When an image file is communicated to personal computer 202 (FIG. 2), as described above, an embodiment stores the image file in PC image file region 230 of memory 216. Thumbnail decryption logic 232 is executed to determine if the image has been tampered with. Since thumbnail decryption logic 232 knows the selected portion of the header that was used to specify the encryption pixels, the encrypted encryption pixels are retrieved and compared with the reference pixel of the pixel pair. For example, and in reference to Table 1 above, the encrypted pixel from high resolution image 106 in the 980,1000 location is retrieved (having a value of 110). Also, the corresponding reference pixel from thumbnail image 108 in the 49,50 location is retrieved (having a value of 100). The green data is compared, indicating a difference of 1. Thus, part of the encryption code (having a value of 1) is determined. Similarly, the other three pixel pairs are evaluated, such that the entire encryption code of "1234" is determined.

Thumbnail decryption logic 232 also knows that the correct encryption code is "1234" in an unaltered image. Thus, since the determined encryption code and the known encryption code agree, the image is determined to not have been tampered with.

If the image has been tampered with, and assuming a sufficient number of pixels over a sufficiently large area of the image have been encrypted, the altering of the pixel data as the image is tampered with will most probably result in at least one pixel of an encrypted pixel pair being altered. When the pixel pairs are compared to determine a portion of an encryption code, that part of the encryption code determined from a tampered pixel will not correlate to the original encryption code. Thus, the determined encryption code will be different from the original encryption code. Accordingly, the image is known to have been tampered with. An appropriate notification message will be generated and communicated to the user of personal computer 202.

Figure 4:
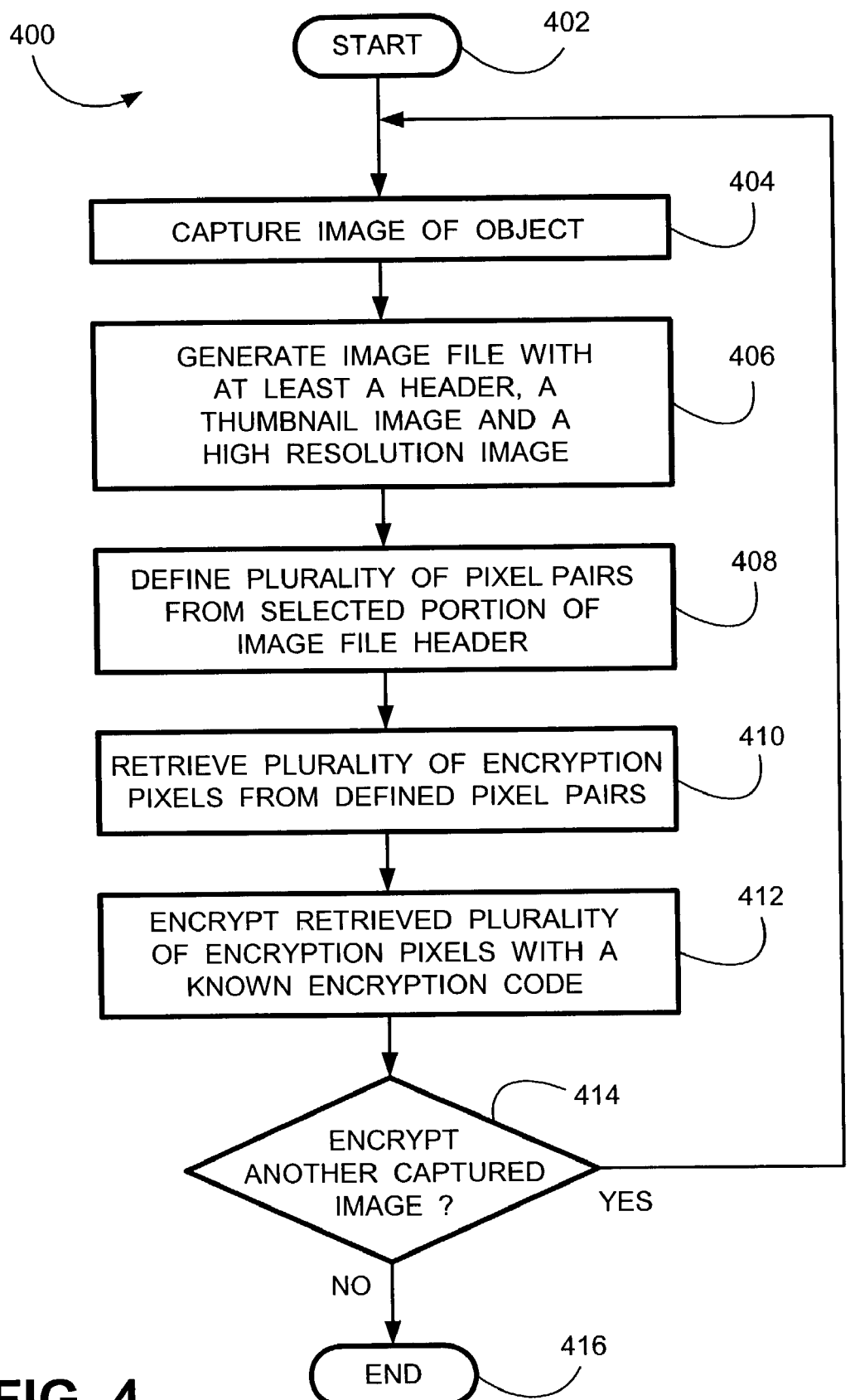
FIG. 4 is a flowchart of a process defining a plurality of pixel pairs based upon a predefined portion of an image file header, and encrypting a known encryption code into selected encryption pixels.

FIG. 4 is a flowchart of a process defining a plurality of pixel pairs based upon a predefined portion of an image file header, and encrypting a known encryption code into selected encryption pixels with an embodiment of the image capture device 102 of FIGS. 1–3. Flowchart 400 shows the architecture, functionality, and operation of one implementation of thumbnail encryption system 100 configured to define a plurality of pixel pairs residing in a high resolution image 106 and in a thumbnail image 108 based upon a predefined portion of an image file header, and the encryption of a known encryption code into selected encryption pixels. In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified hereinbelow.

The process starts at block 402. At block 404, the image capture device 102 captures an image of the object of interest. At block 406, light information corresponding to the captured image of the object is received such that an image file is generated having at least a header, a thumbnail image and a high resolution image. At block 408, a plurality of pixel pairs are defined from a predefined selected portion of the image file header. At block 410, the encryption pixels from the defined plurality of pixel pairs are retrieved. At block 412, the retrieved encryption pixels are encrypted with a known encryption code.

At block 414, a determination is made whether to encrypt another captured image. If so (the YES condition), the process returns to block 404. If not (the NO condition), the process ends at block 416.

Figure 5:
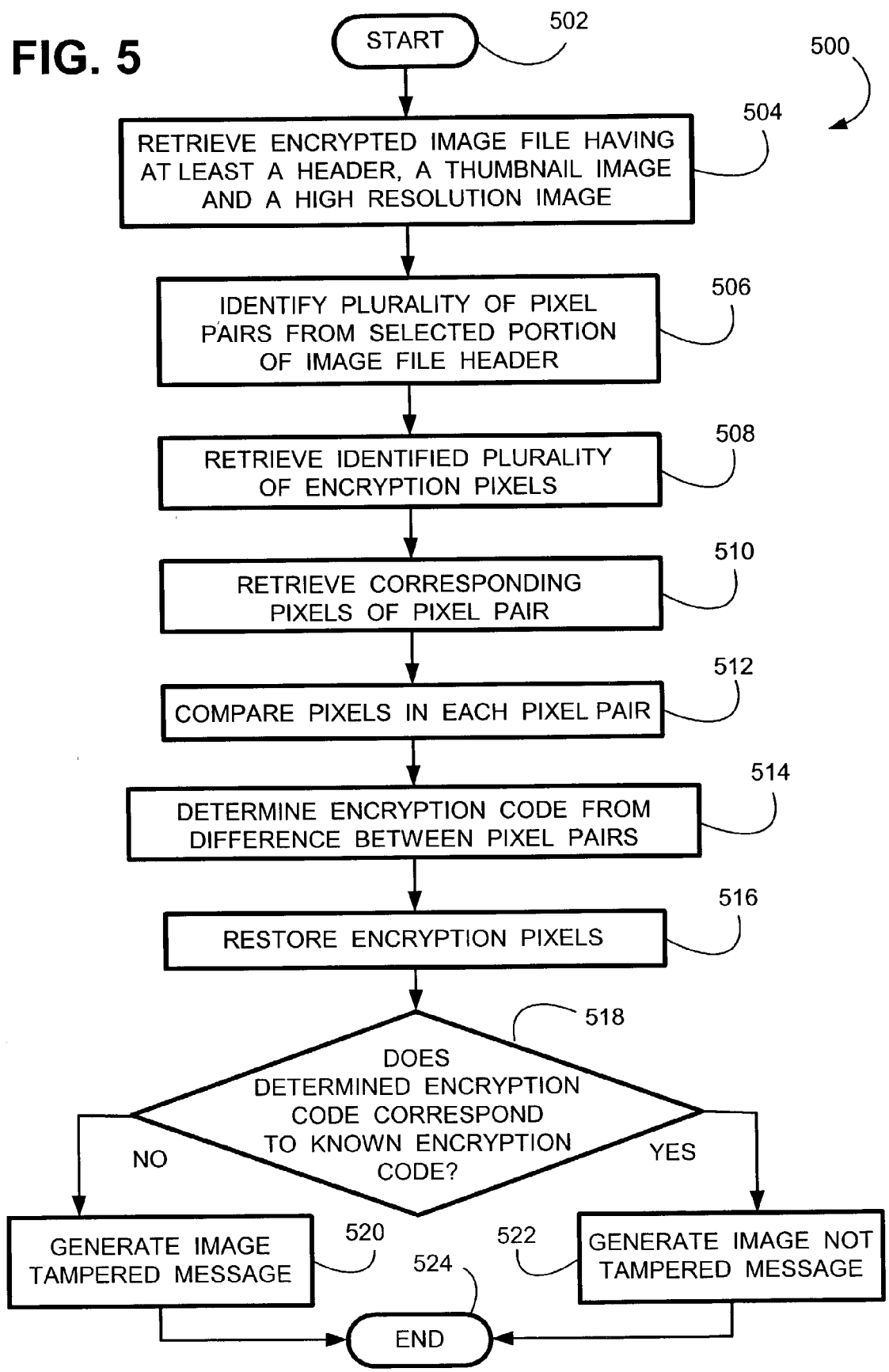
FIG. 5 is a flowchart of a process defining a plurality of pixel pairs based upon a predefined portion of an image file header, and decrypting a known encryption code from selected encryption pixels.

FIG. 5 is a flowchart of a process defining a plurality of pixel pairs based upon a predefined portion of an image file header, and decrypting a known encryption code from selected encryption pixels with an embodiment of personal computer 202 of FIG. 2. Flowchart 500 shows the architecture, functionality, and operation of one implementation of thumbnail decryption logic 232 configured to define a plurality of pixel pairs residing in a high resolution image 106 and in a thumbnail image 108 based upon a predefined portion of an image file header, and the decryption of a known encryption code from selected encryption pixels. In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as will be further clarified hereinbelow.

The process starts at block 502. At block 504, an encrypted image file having at least a header, a thumbnail image and a high resolution image is retrieved from a memory. At block 506, a plurality of pixel pairs are defined based upon a predefined selected portion of the image file header.

At block 508, a plurality of encrypted encryption pixels are retrieved. At block 510, the corresponding pixels of each pixel pair are retrieved. At block 512, for each pixel pair, a comparison is made to determine the difference in the data between the encryption pixel and the reference pixel of each pixel pair. At block 514, the encryption code is determined based upon the difference between the data of the pixels in the retrieved pixel pairs.

Preferably, in one embodiment, at block 516, the encryption pixels are restored and/or reconfigured to their pre-encryption value. The pre-encryption value of an encryption pixel is determined as described above using the reference pixel data. An alternative embodiment may omit block 516 if the encrypted pixels have been altered such that the altered pixel, when displayed, is not visibly discernible to a viewer of the image, or if it is desirable to have the pixel distortion viewed by a viewer of the encrypted image.

At block 518, a determination is made whether the determined encryption code corresponds to the known encryption code. If not (the NO condition), the image has been tampered with. Accordingly, at block 520, an image tampered message is generated and indicated to the viewer of the image. If at block 518 the determined encryption code corresponds with the known encryption code (the YES condition), the image has not been tampered with. Accordingly, an image not tampered with message is generated and displayed to the viewer of the image. The process ends at block 524 after the appropriate message has been generated at block 520 or block 522. Another embodiment may omit block 518 and not display a message to indicate no image tampering.

A second encryption system and method resides in another embodiment of the thumbnail encryption logic 308 (FIG. 3A) implemented in digital camera 102. For convenience, the second encryption system and method is described below as implemented in the thumbnail encryption logic 308. The second encryption system and method is similarly implemented in an embodiment of PC thumbnail encryption logic 234 (FIG. 2A). Furthermore, as described herein, the encryption logic and/or the decryption logic may be implemented in other devices, such as, but not limited to, digital video cameras, FAX machines, copy machines or the like that are configured to generate image files having at least a header, a high resolution image and a thumbnail image as described herein. Accordingly, for convenience and brevity, such other variants of the second encryption system and method (or second decryption system and method) as implemented in other devices are not described herein in detail.

The second encryption system and method selects pixel pairs based upon predefined locations of one pixel in the pixel pairs. The predefined locations are known to thumbnail encryption logic 308 and are not easily identified, or preferably not identifiable, by an individual or code-breaking program. One pixel of each of the pixel pairs, the encryption pixel, is encoded by thumbnail encryption logic 308 with information that at least identifies the image file. Accordingly, a pixel location table 258 is employed for both encryption and decryption, where pixel location table 258 specifies the location of at least one of the pixels of each predefined pixel pair. FIGS. 2B and 3B are block diagrams illustrating pixel location table 258 residing in memory 216 of digital camera 102 and in memory element 302 of personal computer 202, respectively.

As a simplified illustrative example, let the pixel pairs be defined by the locations 49,50 in the thumbnail image 108 and 980,1000 in the high resolution image 106; 51,46 in the thumbnail image 108 and 1020,920 in the high resolution image 106; 97,89 in the thumbnail image 108 and 1940,1960 in the high resolution image 106; and 99,122 in the thumbnail image 108 and 1980,2440 in the high resolution image 106. Accordingly, four pixel pairs are identified where the first number pair identifies the location of a pixel in thumbnail image 108 and the second number pair identifies the location of a pixel in high resolution image 106. The predefined pixel locations are also known to a corresponding embodiment of the thumbnail decryption logic 232.

Another embodiment only identifies pixel locations of pixels residing in thumbnail image 108 or in high resolution image 106. Thus, since spatial relationships of the pixels of thumbnail image 108 and high resolution image 106 are known, the locations of both pixels of the pixel pair are easily determined.

One of the pixels in thumbnail image 108 or high resolution image 106 is selected for encryption, identified herein as the encryption pixel. The encryption pixels are encrypted with an encryption code that is unique to the image file.

One embodiment defines the encryption code from a selected portion of the header, such as the file name. For convenience, the second encryption system and method is described as defining the encryption code based upon a simplified, exemplary file name "123.abcz" associated with the encrypted image file. The file name "123.abcz" is unique to the image file.

The file name "123.abcz" is converted into an encryption code using a suitable character system such as, but not limited to, ASCII character codes. Thus, the file name "123.abcz" is converted to the following number string: 49, 50, 51, 46, 97, 98, 99 and 122. For example, the character "1" has the ASCII character code of 49, the character "." has the ASCII character code of 46, and the character "a" has the ASCII character code of 97.

In the simplified illustrative example above, the generated ASCII character code string 49, 50, 51, 46, 97, 98, 99 and 122 specifies the encryption code. The encryption code corresponds to the file name "123.abcz" of the image file. Since encryption pixel of the pixel pairs that are to be encrypted with the encryption code are predefined, thumbnail encryption logic 308 retrieves the encryption pixel for each pixel pair and embeds a portion of the encryption code into each encryption pixel. As described above, thumbnail encryption logic 308 employs pixel location table 258 that specifies the location of at least one of the pixels of each predefined pixel pair.

Headers include a variety of information. The simplistic example above demonstrates one embodiment wherein a portion of the header defines the encryption code. Any portion of the header may be selected to define an encryption code. Accordingly, very complex encryption codes can be determined and embedded into selected encryption pixels. In this embodiment, the location of selected pixel pairs are predefined (via the pixel location table 258) and known to thumbnail encryption logic 308. As will be discussed below, the selected portion of the header and the encryption code is also known to thumbnail decryption logic 232.

In an alternative embodiment, the user of digital camera 102 specifies a portion of the header that will be used to specify pixel pairs and/or the user specifies an encryption code. Here, the user specified portion of the header and/or encryption code is communicated to thumbnail decryption logic 232 so that the image can be decrypted.

When an image file is communicated to personal computer 202 (FIG. 2A), as described above, the image file is stored in PC image file region 230 of memory 216. Thumbnail decryption logic 232 is executed to determine if the image has been tampered with. The thumbnail decryption logic 232 includes the predefined pixel location table 258 that specifies the location of at least one of the pixels of each predefined pixel pair. Pixel location table 258 may specify the location of encrypted pixels, the location of the corresponding reference pixel, or both locations. Preferably, pixel location table 258 is secretly coded into thumbnail decryption logic 232 such that the pixel location information cannot be retrieved or altered.

Since thumbnail decryption logic 232 determines the location of the selected encryption pixels, the encrypted encryption pixels are compared with the reference pixel of the pixel pair. The difference between the encryption pixels and the reference pixels define the encryption code of 49, 50, 51, 46, 97, 98, 99 and 122. Since the encryption code defines a series of characters based upon the ASCII character codes, the encryption code of 49, 50, 51, 46, 97, 98, 99 and 122 determines a character string of "123.abcz" that should correspond to the file name (the selected portion of the header in the above-described, simplistic example).

If the file name determined from the encryption code and the file name of the image file agree, the image is determined to not have been tampered with. If the image is tampered with, and assuming a sufficient number of pixels over a sufficiently large area of the image have been encoded, the altering of the pixel data as the image is tampered with will most probably result in at least one pixel of a pixel pair being altered. When the pixel pairs are compared to determine a portion of an encryption code, that part of the encryption code determined from a tampered pixel will not correlate to the original encryption code. Thus, the file name determined from the encryption code will be different from the file name of the image file. Accordingly, the image is known to have been tampered with. An appropriate notification message will be generated and communicated to the user of personal computer 202.

Figure 6:
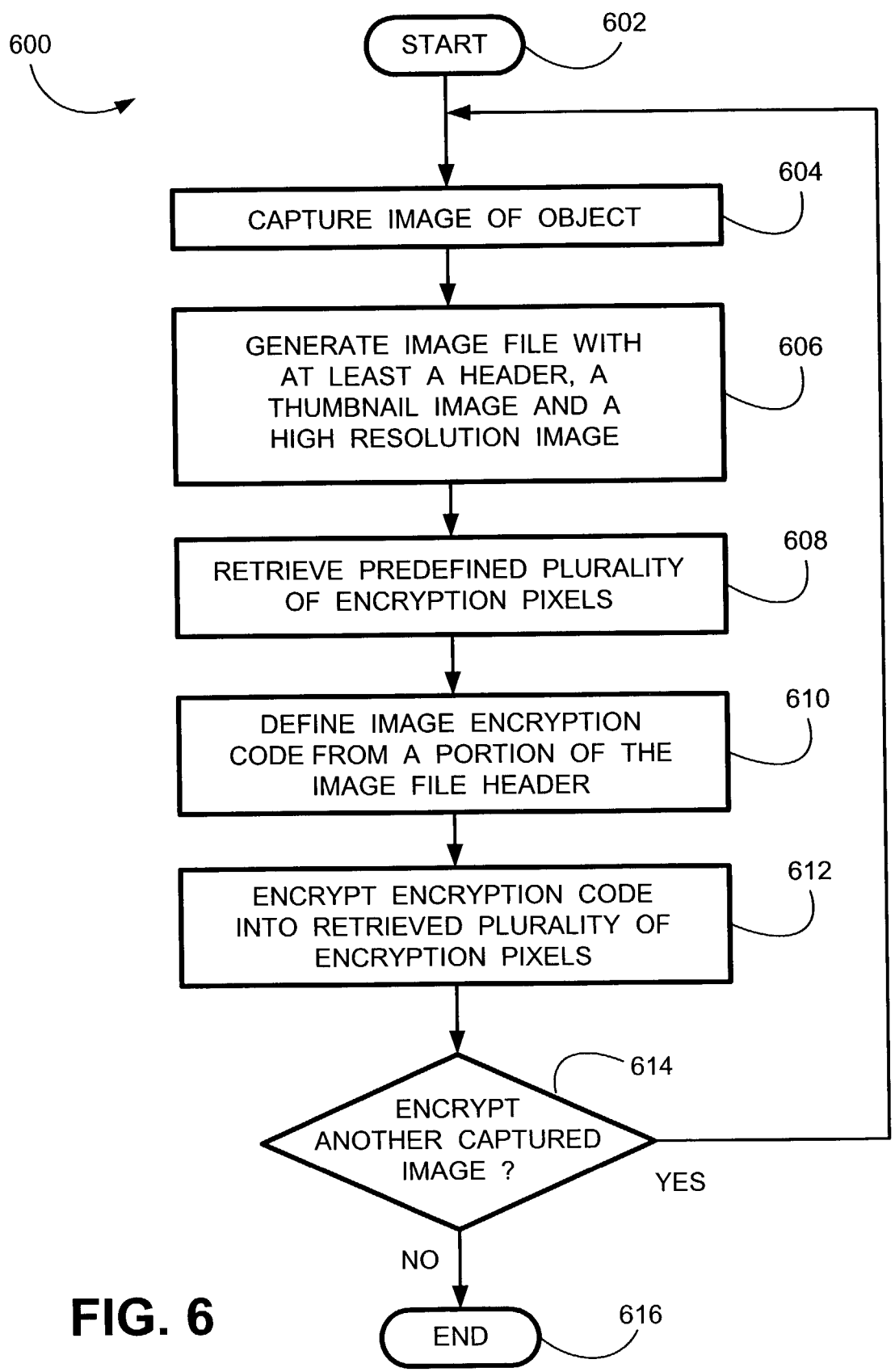
FIG. 6 is a flowchart of a process encrypting a predefined plurality of pixel pairs with an encryption code.

FIG. 6 is a flowchart of a process encrypting a predefined plurality of pixel pairs with an encryption code with an embodiment of the image capture device 102 of FIGS. 1–3. Flowchart 600 shows the architecture, functionality, and operation of one implementation of thumbnail encryption system 100 configured to encode a predefined plurality of pixel pairs residing in high resolution image 106 and in thumbnail image 108 with an encryption code. The encryption code is based upon a predefined portion of an image file header. In this regard, each block represents a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved, as will be further clarified hereinbelow.

The process starts at block 602. At block 604, the image capture device 102 captures an image of the object of interest. At block 606, light information corresponding to the captured image of the object is received such that an image file is generated having at least a header, a thumbnail image and a high resolution image. At block 608, a predefined plurality of pixel pairs are retrieved. As described above, the location of at least one of the pixels of each pixel pair is determined from the pixel location table 258. At block 610, an encryption code is determined based upon information from a predetermined selected portion of the image file header. At block 612, the retrieved encryption pixels are encrypted with a defined encryption code.

At block 614, a determination is made whether to encrypt another captured image. If so (the YES condition), the process returns to block 604. If not (the NO condition), the process ends at block 616.

Figure 7:
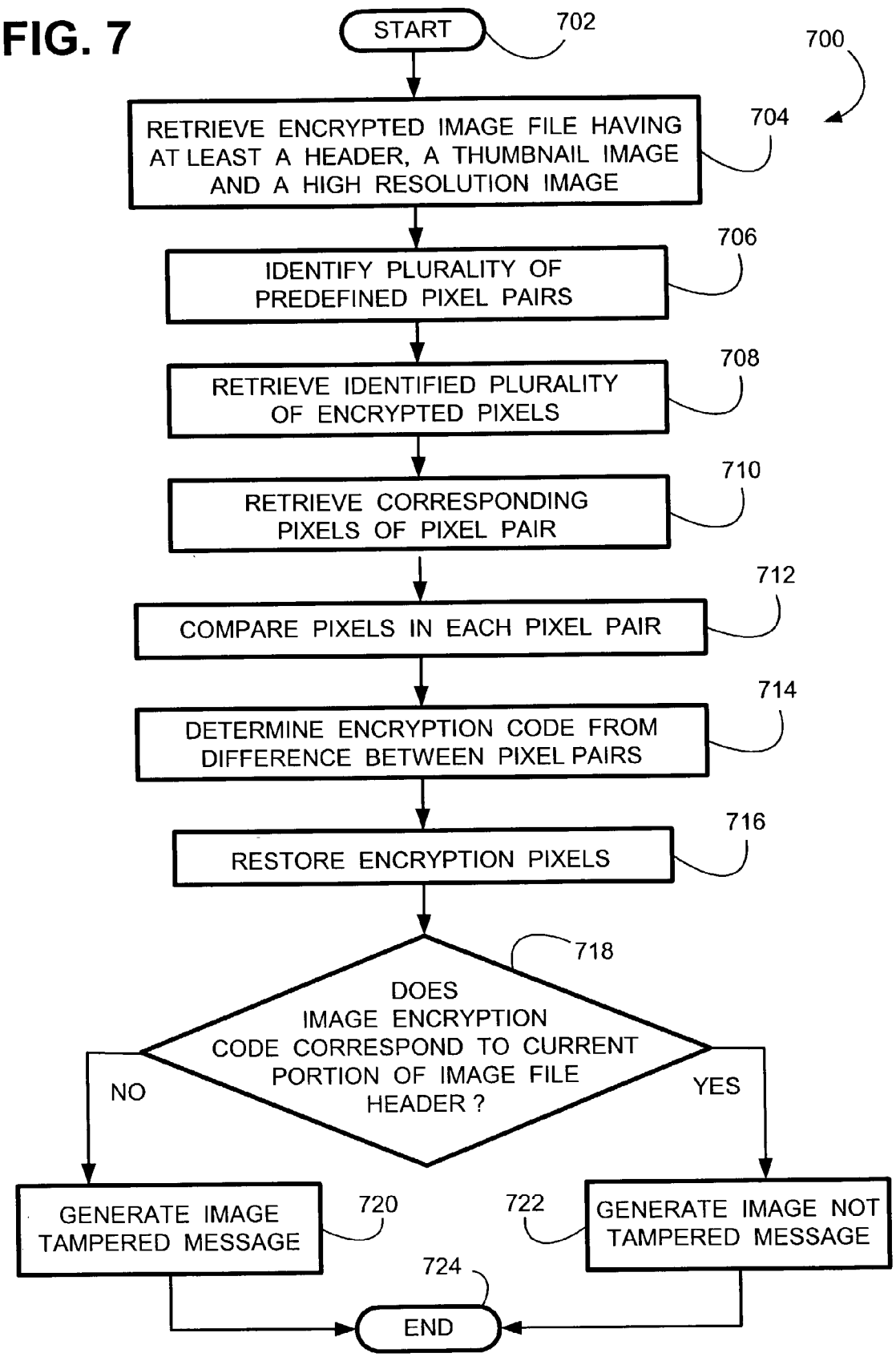
FIG. 7 is a flowchart of a process defining a plurality of pixel pairs based upon a predefined portion of an image file header, and decrypting a known encryption code from selected encryption pixels.

FIG. 7 is a flowchart of a process defining a plurality of pixel pairs based upon a predefined portion of an image file header, and decrypting a known encryption code from selected encryption pixels with an embodiment of personal computer 202 of FIG. 2A. Flowchart 700 shows the architecture, functionality, and operation of one implementation of thumbnail decryption logic 232 configured to define a plurality of pixel pairs residing in high resolution image 106 and in thumbnail image 108 based upon a predefined portion of an image file header, and the decryption of a known encryption code from selected encryption pixels. In this regard, each block represents a module, segment, or portion of code, which comprises one or more executable instructions for implementing the specified logical function(s). It should also be noted that in some alternative implementations, the functions noted in the blocks may occur out of the order noted in FIG. 7. For example, two blocks shown in succession in FIG. 7 may in fact be executed substantially concurrently or the blocks may sometimes be executed in the reverse order, depending upon the functionality involved, as will be further clarified hereinbelow.

The process starts at block 702. At block 704, an encrypted image file having at least a header, a thumbnail image and a high resolution image is retrieved from a memory. At block 706, a plurality of predefined pixel pairs are identified from the pixel location information in the pixel location table 258.

At block 708, a plurality of encrypted encryption pixels from the identified pixel pairs are retrieved. As described above, the location of at least one of the pixels of each pixel pair is determined from the pixel location table 258. At block 710, the corresponding pixels of each pixel pair are retrieved. At block 712, for each pixel pair, a comparison is made to determine the difference in the data between the encryption pixel and the reference pixel of each pixel pair. At block 714, the encryption code is determined based upon the difference between the data of the pixels in the retrieved pixel pairs.

Preferably, in one embodiment, at block 716, the encryption pixels are restored and/or reconfigured to their pre-encryption value. The pre-encryption value of the encryption pixels is determined as described above using the reference pixel data. An alternative embodiment may omit block 716 if the encrypted pixels have been altered such that the altered pixel, when displayed, is not visibly discernible to a viewer of the image, or if it is desirable to have the pixel distortion viewed by a viewer of the encrypted image.

At block 718, a determination is made whether the determined encryption code corresponds to a predefined portion of the header of the current image file. If not (the NO condition), the image has been tampered with. Accordingly, at block 720, an image tampered message is generated and indicated to the viewer of the image. If at block 718 the determined encryption code corresponds to the predefined portion of the header of the current image file (the YES condition), the image has not been tampered with. Accordingly, an image not tampered with message is generated and displayed to the viewer of the image. The process ends at block 724 after the appropriate message has been generated at block 720 or block 722. Another embodiment may omit block 718 and not display a message to indicate no image tampering.

When an image is captured by digital camera 102, or another suitably configured image capture device, pixels residing in photosensor 304 (or a photosensor if implemented in another image capture device) communicate light information to camera processor 306 (or a processor device if implemented in image capture device). In one embodiment, the above-described encryption of the encryption pixels is implemented concurrently with the generation of high resolution image 106 and thumbnail image 108.

In another embodiment, encryption of the encryption pixels occurs after an image file has been generated. Thus, light information from the photosensor 304 is received and an image file having at least a header, a high resolution image and a thumbnail image is generated. After the image file is generated, the embodiment performs the above-described encryption of the encryption pixels.

In one embodiment, a suitable controller, such as, but not limited to, control button 110, is actuated to cause digital camera 102 to operate in a thumbnail encryption mode. Accordingly, a subsequently captured image is then encrypted. Digital camera 102 remains in the thumbnail encryption mode until control button 110 is actuated a second time, or until digital camera 102 is deactivated (shut off).

Alternatively, digital camera 102 may be configured to capture only the next image in an encryption mode, with an automatic return to a non-encryption mode of operation after the next image is captured. Thus, each image that is to be encrypted is identified by actuation of control button 110.

The above-described controller may be any suitable actuating device configured to at least allow a user to cause encryption of an image file. Examples of control button 110 include, but are not limited to, a push-button, a toggle-switch, a multi-position sensing device configured to sense a plurality of switch positions, a touch sensitive device or a light sensitive device. In one embodiment, the control button 110 is a multifunction controller configured to at least cause digital camera 102 to operate in a thumbnail encryption mode of operation. Furthermore, the controller may be implemented as a menu screen displayed on display 120 and configured to cause digital camera 102 to operate in a thumbnail encryption mode of operation.

Figure 8:
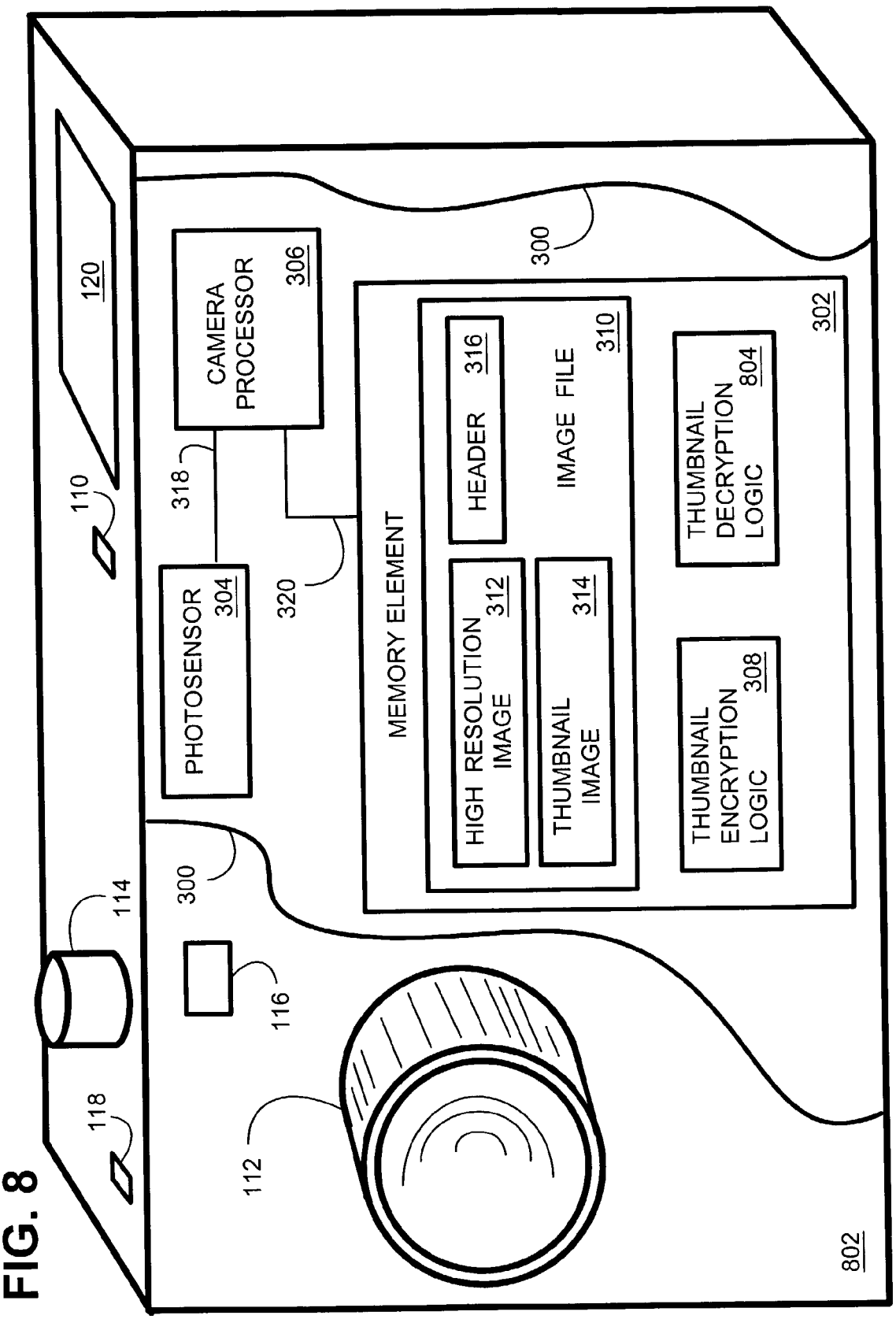
FIG. 8 is a block diagram of selected components of an embodiment of a digital camera having camera decryption logic.

Various embodiments of the thumbnail decryption logic 232 (FIG. 2A) residing in personal computer 202 were described above. FIG. 8 is a block diagram of selected components of an embodiment of a digital camera 802 having camera decryption logic 804. The camera decryption logic 804 is configured to decrypt image files that have been encrypted in accordance with the above-described embodiments of the thumbnail encryption system 100. Thus, a user of digital camera 802 may retrieve, from a remote memory, an encrypted image file. When the thumbnail image is viewed on display 120, when the digital camera 802 is operating in a review mode, a determination is made whether or not the image has been tampered with. If the image has been tampered with, a suitable message indicating image tampering is displayed on display 120. If the image has not been tampered with, one embodiment displays a suitable message indicating no image tampering on display 120. Another embodiment simply displays no message to indicate no image tampering.

Any of the above-described encryption processes may also be implemented in a similar manner in personal computer 202 or in another suitably configured image capture device. For example, but not limited to, PC thumbnail encryption logic may reside in memory 216 (FIG. 2A). Accordingly, image files having at least a header, a thumbnail image and a high resolution image are retrieved from PC image file region 230. The retrieved image file is encrypted. Such encryption process are exemplified in the flow charts 400 and 600 of FIGS. 4 and 6, respectively. Thus, later tampering with the encrypted image file can be detected.

Furthermore, an image file from another device or memory can be retrieved and encrypted. A conventional digital camera may employ a memory module unit 252 where the image file is retrieved from. Or, the conventional digital camera could be coupled to personal computer 202 and the image file retrieved from a memory residing in the digital camera. Or, the image file could be retrieved from a remote memory via the Internet. Or, the image file could be retrieved from another suitable computer-readable memory medium. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic, compact flash card, secure digital, or the like), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

What is claimed is:

1. A method for uniquely identifying captured images using an image capture device, the method comprising the steps of:
    receiving information corresponding to a captured image from a photosensor;
    generating a first image from the received information, the first image comprised of at least a plurality of first pixels corresponding to the captured image;
    generating a second image from the received information, the second image having a different resolution than the first image and comprised of at least a plurality of second pixels corresponding to the captured image;
    generating a header, the header comprised of information corresponding to the received information;
    selecting a plurality of encryption pixels from the plurality of first pixels, such that each one of the plurality of selected encryption pixels corresponds uniquely to one of the plurality of second pixels of the second image;
    altering data of each one of the selected plurality of encryption pixels such that information uniquely identifying the captured image is encrypted into the selected plurality of encryption pixels, and such that corresponding ones of the plurality of second pixels remains unaltered so that the information is determinable by comparing the encrypted pixels with the unaltered second pixels;
    selecting a portion of the header, the selected portion of the header having information corresponding to a plurality of characters; and
    defining from each one of the plurality of characters of the selected header portion a plurality of encryption pixel locations, each one of the encryption pixel locations identifying a location of one of the encryption pixels.

2. The method of claim 1, further comprising the step of combining at least the header information, the first image and the second image into an image file.

3. The method of claim 1, wherein the first image is a lower resolution image relative to the second image.

4. The method of claim 3, wherein the first image is a thumbnail image.

5. The method of claim 1, wherein the first image is a higher resolution image relative to the second image.

6. The method of claim 5, wherein the second image is a thumbnail image.

7. The method of claim 1, further comprising the step of actuating a controller configured to cause the image capture device to operate in a thumbnail encryption mode such that when an image is captured, an image file is generated having at least the header, the first image with the plurality of encryption pixels tat are encrypted with information uniquely identifying the captured image, and the second image.

8. The method of claim 7, wherein the image capture device comprises at least one selected from the group consisting of a digital camera, a facsimile (FAX) machine and a copy machine.

9. The method of claim 1, wherein the step of defining further comprises the steps of:
    comparing each one of the plurality of characters with a character code, the character code uniquely associating each one of the plurality of characters with one of a plurality of numeric values; and
    defining the plurality of encryption pixel locations from the associated numeric values.

10. The method of claim 9, wherein the character code is based upon an American standard code for information interchange (ASCII).

11. The method of claim 9, wherein the character code is based upon a predefined table having at least each one of the plurality of characters and the corresponding numerical value.

12. The method of claim 9, further comprising the steps of:
    defining an order of the selected encryption pixels, the defined order of the selected encryption pixels corresponding to an order of the characters of the selected header portion; and
    dividing the information uniquely identifying the captured image into a plurality of ordered information portions,
    wherein the step of altering the data of each one of the selected encryption pixels further comprises the step of encrypting each selected encryption pixel with one of the ordered information portions such that each one of the ordered selected encryption pixels is encrypted in order with the corresponding ordered information portion.

13. The method of claim 9, further comprising the step of defining a plurality of second pixel locations, the plurality of second pixel locations corresponding to the plurality of encryption pixel locations, and the plurality of second pixel locations defining the location of the corresponding ones of the plurality of second pixels.

14. The method of claim 1, further comprising the steps of:
    defining a location for each one of the plurality of encryption pixels from a predefined location table; and
    specifying information that uniquely identifies the captured image, such that when the step of altering the data of the selected encryption pixels is performed, the selected information uniquely identifying the captured image is encrypted into the selected encryption pixels.

15. The method of claim 14, wherein the step of specifying further comprises the step of selecting a portion of the header, the selected portion of the header uniquely identifying the captured image.

16. The method of claim 14, wherein the step of specifying further comprises the step of selecting a filename of an image file, the image file comprised of at least the header information, the first image and the second image.

17. The method of claim 14, wherein the predefined location table defines at least the location of each one of the encryption pixels.

18. The method of claim 14, wherein the predefined location table defines at least a location for each one of the plurality of second pixels corresponding to the encryption pixels, and wherein the step of defining the location for each one of the plurality of encryption pixels further comprises the step of correlating the location of each one of the plurality of second pixels with a relative displacement so that the location for each one of the encryption pixels is determined.

19. A method for uniquely identifying a captured image, the method comprising the steps of:
receiving a first image, a second image, and a header having at least information corresponding to the captured image, the first image comprised of a plurality of first pixels corresponding to the captured image, and the second image comprised of a plurality of second pixels corresponding to the captured image;
selecting a plurality of encryption pixels from the plurality of first pixels, such that each one of the plurality of selected encryption pixels corresponds uniquely to one of the plurality of second pixels of the second image; end
altering data of each one of the selected plurality of encryption pixels such that information uniquely identifying the captured image is encrypted into the selected plurality of encryption pixels, and such that the corresponding ones of the plurality of second pixels remains unaltered so that the information is determinable by comparing the encrypted pixels with the unaltered second pixels;
selecting a portion of the header, the selected portion of the header having information corresponding to a plurality of characters; and
defining from each one of the plurality of characters of the selected portion of the header a plurality of encryption pixel locations, each one of the encryption pixel locations identifying a location of one of the encryption pixels.

20. The method of claim 19, wherein the first image is a lower resolution image relative to the second image.

21. The method of claim 20, wherein the first image is a thumbnail image.

22. The method of claim 19, wherein the first image is a higher resolution image relative to the second image.

23. The method of claim 22, wherein the second image is a thumbnail image.

24. The method of claim 19, wherein the step of defining further comprises the steps of:
comparing each one of the plurality of characters with a character code, the character code uniquely associating each one of the plurality of characters with one of a plurality of numeric values; and
defining the plurality of encryption pixel locations from the associated numeric values.

25. The method of claim 24, wherein the character code is based upon an American standard code for information interchange (ASCII).

26. The method of claim 25, wherein the character code is based upon a predefined table having at least each one of the plurality of characters and the corresponding numerical value.

27. The method of claim 19, further comprising the steps of:
defining an order of the selected encryption pixels, the defined order of the selected encryption pixels corresponding to the order of the characters of the selected portion of the header; and
dividing the information uniquely identifying the captured image into a plurality of ordered information portions,
wherein the step of altering the data of each one of the selected encryption pixels further comprises the step of encrypting each selected encryption pixel with one of the ordered information portions such that each one of the ordered selected encryption pixels is encrypted in order with the corresponding ordered information portion.

28. A method for uniquely identifying captured images, the method comprising the steps of:
accessing a first image corresponding to a captured image comprised of at least a plurality of encryption pixels;
accessing a second image corresponding to the captured image comprised of at least a plurality of second pixels, the second image having a different resolution than the first image, and each one of the plurality of second pixels uniquely corresponding to one of the plurality of encryption pixels; and
accessing a header comprised of information corresponding to the received image file;
retrieving the plurality of encryption pixels;
retrieving the plurality of corresponding second pixels;
determining a difference between each one of the retrieved encryption pixels and the corresponding second pixel;
determining information corresponding to the determined difference; and
comparing the determined information with predefined information such tat when the determined information corresponds to the predefined information the captured image is known to be unaltered, and such that when the determined information is different from the predefined information the captured image is known to be altered;
selecting a portion of the header, the selected portion of the header having information corresponding to a plurality of characters; and
defining from each one of the plurality of characters of the selected portion of the header a plurality of encryption pixel locations, each one of the encryption pixel locations identifying a location for each one of the encryption pixels.

29. The method of claim 28, wherein the first image is a lower resolution image relative to the second image.

30. The method of claim 29, wherein the first image is a thumbnail image.

31. The method of claim 28, wherein the first image is a higher resolution image relative to the second image.

32. The method of claim 31, wherein the second image is a thumbnail image.

33. The method of claim 28, further comprising the step of altering data of the encryption pixel to correspond to data of the corresponding second pixel so that when the first image is displayed the displayed first image appears undistorted.

34. The method of claim 28, wherein the step of defining further comprises the steps of:
comparing each one of the plurality of characters with a character code, the character code uniquely associating each one of the plurality of characters with one of a plurality of numeric values; and defining the plurality of encryption pixel locations from the associated numeric values.

35. The method of claim 34, wherein the character code is based upon an American standard code for information interchange (ASCII).

36. The method of claim 34, wherein the character code is based upon a predefined table having at least each one of the plurality of characters and the corresponding numerical value.

37. The method of claim 34, further comprising the step of defining a plurality of second pixel locations, the plurality of second pixel locations corresponding to the plurality of encryption pixel locations, and the plurality of second pixel locations defining the location of the corresponding ones of the plurality of second pixels.

38. The method of claim 28 wherein the predefined information corresponds to a predetermined encryption code encrypted into the encryption pixels when an original image file was generated, and wherein the determined information is a corresponding encryption code determined from the received image file, such that when the encryption code determined from the received image file corresponds to the predetermined encryption code the captured image is known to be unaltered, and such tat when the encryption code determined from the received image file is different from the predetermined encryption code the captured image is known to be altered.

39. The method of claim 28, further comprising the step of retrieving a location file that determines at least the location of each one of the retrieved plurality of encryption pixels.

40. The method of claim 39, further comprising the step of specifying the location of each one of the plurality of encryption pixels from the location file.

41. The method of claim 39, further comprising the step of specifying the location of each one of the plurality of second pixels from the location file.

42. The method of claim 39, wherein the determined information corresponds to a selected portion of the header that uniquely identifies an original image file, and wherein the predefined information is a corresponding portion of the header of the received image file.

43. The method of claim 39, wherein the determined information corresponds to a filename of an original image file, and wherein the predefined information corresponds to a filename of the received image file.

44. A computer readable medium storing a program for encrypting captured images, the program comprising logic configured to perform the steps of:
receiving at least a first image, a second image, the second image having at least a plurality of reference pixels and having a different resolution than the first image, and a header comprised of information corresponding to the received image file, wherein the first image, the second image and the header correspond to a captured image;
generating a third image corresponding to the first image and having at least a plurality of encryption pixels, and such that each one of the encryption pixels corresponds uniquely to one of the reference pixels in the second image;
altering data of each one of the plurality of encryption pixels such that information uniquely identifying the captured image is encrypted into the selected plurality of encryption pixels, and such that the corresponding ones of the plurality of reference pixels remains unaltered so that the information is determinable by comparing the encrypted pixels with the unaltered reference pixels;
generating an encrypted image file comprised of at least the second image, the third image and the header;
selecting a portion of the header, the selected portion of the header having information corresponding to a plurality of characters:
comparing the information corresponding to each one of the plurality of characters with a character code, the character code uniquely associating each one of the plurality of characters with one of a plurality of numeric values; and
defining a plurality of encryption pixel locations from, the associated numeric values, each one of the encryption pixel locations identifying a location of each one of the encryption pixels.

45. The computer readable medium of claim 44 further comprising loge configured to perform the steps of:
defining an order of the selected encryption pixels, the defined order of the selected encryption pixels corresponding to the order of the characters of the selected header portion; and
dividing the information uniquely identifying the captured image into a plurality of ordered information portions,
wherein the step of altering the data of each one of the selected encryption pixels further comprises the step of encrypting each selected encryption pixel with one of the ordered information portions such that each one of the ordered selected encryption pixels is encrypted in order with the corresponding ordered information portion.

46. The computer readable medium of claim 44, further comprising logic configured to perform the steps of:
receiving information from a location table that identifies a location for each one of the plurality of encryption pixels; and
specifying information that uniquely identifies the captured image, such that when the step of altering the data of the selected encryption pixels is performed, the selected information uniquely identifying the captured image is encrypted into the selected encryption pixels.

47. The computer readable medium of claim 44, further comprising logic configured to perform the step of selecting a portion of the header, the selected portion of the header uniquely identifying the captured image.

48. The computer readable medium of claim 44, further comprising logic configured to perform the step of selecting a filename of the image file.

49. A computer readable medium storing a program for decrypting image files, the program comprising logic configured to perform the steps of:
receiving an image file;
receiving a first image corresponding to a captured image and comprised of at least a plurality of encryption pixels;
receiving a second image corresponding to the captured image and comprised of at least a plurality of second pixels, the second image having a different resolution than the first image, and each one of the plurality of second pixels uniquely corresponding to one of the plurality of encryption pixels; and
receiving a header comprised of information corresponding to the received image file;
retrieving the plurality of encryption pixels;
retrieving the plurality of corresponding second pixels;

determining a difference between each one of the retrieved encryption pixels and the corresponding second pixel;

determining information corresponding to the determined difference;

comparing the determined information with predefined information such that when the determined information corresponds to the predefined information the captured image is known to be unaltered, and such that when the determined information is different from the predefined information the captured image is known to be altered;

selecting a portion of the header, the selected portion of the header having information corresponding to a plurality of characters; and defining from each one of the plurality of characters of the selected portion of the header a plurality of encryption pixel locations, each one of the encryption pixel locations identifying a location for each one of the encryption pixels.

50. The computer readable medium of claim 49, wherein the first image is a lower resolution image relative to the second image.

51. The computer readable medium of claim 50, wherein the first image is a thumbnail image.

52. The computer readable medium of claim 49, wherein the first image is a higher resolution image relative to the second image.

53. The computer readable medium of claim 52, wherein the second image is a thumbnail image.

54. The computer readable medium of claim 49, further comprising logic configured to perform the step of altering data of the encryption pixel to correspond to data of the corresponding second pixel so that when die first image is displayed, the displayed first image appears undistorted.

55. The computer readable medium of claim 49 wherein the step of defining further comprises the steps of:

comparing each one of the plurality of characters with a character code, the character code uniquely associating each one of the plurality of, characters with one of a plurality of numeric values; and defining the plurality of encryption pixel locations from the associated numeric values.

56. The computer readable medium of claim 49, wherein the predefined information corresponds to a predetermined encryption code encrypted into the encryption pixels when an original image file was generated, and wherein the determined information is a corresponding encryption code determined from the received image file, such that when the encryption code determined from the received image file corresponds to the predetermined encryption code the captured image is known to be unaltered, and such that when the encryption code determined from the received image file is different from the predetermined encryption code the captured image is known to be altered.

57. The computer readable medium of claim 49, further comprising logic configured to perform the step of retrieving information from a location file, the information from the location file determining at least a location of each one of the retrieved plurality of encryption pixels.

58. The computer readable medium of claim 57, wherein the location file specifies the location of each one of the plurality of encryption pixels.

59. The computer readable medium of claim 57, wherein the location file specifies the location of each one of the plurality of second pixels.

60. The computer readable medium of claim 57, wherein the determined information corresponds to a selected portion of the header that uniquely identifies an original image file, and wherein the predefined information is a corresponding portion of the header of the received image file.

61. The computer readable medium of claim 57, wherein the determined information corresponds to a filename of an original image file, and wherein the predefined information corresponds to the filename of the received image file.

62. A method for uniquely identifying captured images using an image capture device, the method comprising the steps of:

receiving information corresponding to a captured image from a photosensor;

generating a lust image from the received information, the first image comprised of at least a plurality of first pixels corresponding to the captured image;

generating a second image from the received information, the second image having a different resolution than the first image and comprised of at least a plurality of second pixels corresponding to the captured image;

generating a header, the header comprised of information corresponding to the received information;

selecting a plurality of encryption pixels from the plurality of first pixels, such that each one of the plurality of selected encryption pixels corresponds uniquely to one of the plurality of second pixels of the second image;

altering data of each one of the selected plurality of encryption pixels such that information uniquely identifying the captured image is encrypted into the selected plurality of encryption pixels, and such that corresponding ones of the plurality of second pixels remains unaltered so that the information is determinable by comparing the encrypted pixels with the unaltered second pixels;

selecting a portion of the header, the selected portion of the header having information corresponding to a plurality of characters;

defining from each one of the plurality of characters of the selected header portion a plurality of encryption pixel locations, each one of the encryption pixel locations identifying a location of one of the encryption pixels;

defining a location for each one of the plurality of encryption pixels from a predefined location table; and specifying information that uniquely identifies the captured image, such that when the step of altering the data of the selected encryption pixels is performed, die selected information uniquely identifying the captured image is encrypted into the selected encryption pixels, wherein the predefined location table defines at least a location for each one of the plurality of second pixels corresponding to the encryption pixels, and wherein the step of defining the location for each one of the plurality of encryption pixels further comprises the step of correlating the location of each one of the plurality of second pixels with a relative displacement so that the location for each one of the encryption pixels is determined.

63. A method for uniquely identifying captured images, the method comprising the steps of:

accessing a first image corresponding to a captured image comprised of at least a plurality of encryption pixels;

accessing a second image corresponding to the captured image comprised of at least a plurality of second pixels, the second image having a different resolution than the first image, and each one of the plurality of second pixels uniquely corresponding to one of the plurality of encryption pixels;

accessing a header comprised of information corresponding to the received image file;
retrieving the plurality of encryption pixels;
retrieving die plurality of corresponding second pixels;
determining a difference between each one of the retrieved encryption pixels and the corresponding second pixel;
determining information corresponding to the determined difference;
comparing the determined information with predefined information such tat when the determined information corresponds to the predefined information the captured image is known to be unaltered, and such that when the determined information is different from the predefined information the captured image is known to be altered;
selecting a portion of the header, the selected portion of the header having information corresponding to a plurality of characters;
defining from each one of the plurality of characters of the selected portion of the header a plurality of encryption pixel locations, each one of the encryption pixel locations identifying a location for each one of the encryption pixels; and
retrieving a location file that determines at least the location of each one of the retrieved plurality of encryption pixels,
wherein the determined information corresponds to:
  a selected portion of the header that uniquely identifies an original image file, and wherein the predefined information is a corresponding portion of the header of the received image file; or
  a filename of an original image file, and wherein the predefined information corresponds to a filename of the received image file.

64. A computer readable medium storing a program for decrypting image files, the program comprising logic configured to perform the steps of:
receiving an image file;
receiving a first image corresponding to a captured image and comprised of at least a plurality of encryption pixels;
receiving a second image corresponding to the captured image and comprised of at least a plurality of second pixels, the second image having a different resolution than the first image, and each one of the plurality of second pixels uniquely corresponding to one of the plurality of encryption pixels;
receiving a header comprised of information corresponding to the received image file;
retrieving the plurality of encryption pixels;
retrieving the plurality of corresponding second pixels;
determining a difference between each one of the retrieved encryption pixels and the corresponding second pixel;
determining information corresponding to the determined difference;
comparing the determined information with predefined information such that when the determined information corresponds to the predefined information the captured image is known to be unaltered, and such that when the determined information is different from the predefined information the captured image is known to be altered;
selecting a portion of the header, the selected portion of the header having information corresponding to a plurality of characters;
defining from each one of the plurality of characters of the selected portion of the header a plurality of encryption pixel locations, each one of the encryption pixel locations identifying a location for each one of the encryption pixels; and
retrieving information from a location file, the information from the location file determining at least a location of each one of the retrieved plurality of encryption pixels,
wherein the determined information corresponds to:
  a selected portion of the header that uniquely identifies an original image file, and wherein the predefined information is a corresponding portion of the header of the received image file; or
  a filename of an original image file, and wherein the predefined information corresponds to the filename of the received image file.

* * * * *

UNITED STATES PATENT AND TRADEMARK OFFICE
CERTIFICATE OF CORRECTION

PATENT NO. : 7,190,806 B2
APPLICATION NO. : 10/233836
DATED : March 13, 2007
INVENTOR(S) : Robert P. Cazier It is certified that error appears in the above-identified patent and that said Letters Patent is hereby corrected as shown below:

In column 22, line 6, in Claim 7, delete "tat" and insert -- that --, therefor.

In column 23, lines 24-25, in Claim 19, after "image;" delete "end".

In column 24, line 38, in Claim 28, delete "tat" and insert -- that --, therefor.

In column 25, line 26, in Claim 38, delete "tat" and insert -- that --, therefor.

In column 26, line 8, in Claim 44, delete "characters:" and insert -- characters; --, therefor.

In column 26, line 14, in Claim 44, after "from" delete ",".

In column 26, line 19, in Claim 45, delete "loge" and insert -- logic --, therefor.

In column 26, line 44, in Claim 47, delete "claim 44," and insert -- claim 46, --, therefor.

In column 26, line 48, in Claim 48, delete "claim 44," and insert -- claim 46, --, therefor.

In column 27, line 33, in Claim 54, delete "die" and insert -- the --, therefor.

In column 27, line 35, in Claim 55, delete "claim 49" and insert -- claim 49, --, therefor.

In column 27, line 39, in Claim 55, after "plurality of" delete ",".

In column 28, line 13, in Claim 62, delete "lust" and insert -- first --, therefor.

In column 28, line 46, in Claim 62, delete "die" and insert -- the --, therefor.

In column 29, line 4, in Claim 63, delete "die" and insert -- the --, therefor.

UNITED STATES PATENT AND TRADEMARK OFFICE
CERTIFICATE OF CORRECTION

PATENT NO. : 7,190,806 B2
APPLICATION NO. : 10/233836
DATED : March 13, 2007
INVENTOR(S) : Robert P. Cazier It is certified that error appears in the above-identified patent and that said Letters Patent is hereby corrected as shown below:

In column 29, line 11, in Claim 63, delete "tat" and insert -- that --, therefor.

Signed and Sealed this

Twenty-eighth Day of April, 2009

JOHN DOLL
*Acting Director of the United States Patent and Trademark Office*